(12) United States Patent
Regan

(10) Patent No.: US 8,122,352 B2
(45) Date of Patent: Feb. 21, 2012

(54) PARTS MARKING SYSTEM AND METHOD

(75) Inventor: Nancy Regan, Madison, AL (US)

(73) Assignee: The Force, Inc., Hunstville, AL (US)

( * ) Notice: Subject to any disclaimer, the term of this patent is extended or adjusted under 35 U.S.C. 154(b) by 269 days.

(21) Appl. No.: 12/624,733

(22) Filed: Nov. 24, 2009

(65) Prior Publication Data

US 2010/0070920 A1    Mar. 18, 2010

Related U.S. Application Data

(63) Continuation of application No. 11/252,408, filed on Oct. 17, 2005, now Pat. No. 7,644,359, which is a continuation-in-part of application No. 11/818,964, filed on Oct. 15, 2005.

(60) Provisional application No. 60/619,489, filed on Oct. 15, 2004.

(51) Int. Cl.
  *G06F 17/30* (2006.01)
  *G06K 13/00* (2006.01)
  *G06K 19/00* (2006.01)

(52) U.S. Cl. .................. 715/255; 235/485; 235/487

(58) Field of Classification Search ............. 715/255
  See application file for complete search history.

(56) References Cited

U.S. PATENT DOCUMENTS 6,533,181 B1 * 3/2003 Roxby et al. .............. 235/494
6,986,462 B2 * 1/2006 Venkatesh et al. ........ 235/383

* cited by examiner

*Primary Examiner* — Laurie Ries
*Assistant Examiner* — Tionna Smith
(74) *Attorney, Agent, or Firm* — Lanier Ford Shaver & Payne, P.C.; Ann I. Dennen

(57) ABSTRACT

A parts marking system has memory for storing data indicative of at least one algorithm associated with at least one object material and logic configured to display the at least one algorithm to a display device and receive a user input for at least one part in response to the displayed algorithm.

29 Claims, 22 Drawing Sheets

| Marking Option Dot Peen (DP) 2805 | Marking Option Ink Jet (IJ) 2806 | Marking Option Laser Bonding (LB) 2808 | Marking Option Chemical Etching (CE) 2807 |
|---|---|---|---|
| DP Technical Limitations 1161 | IJ Technical Limitations 1162 | LB Technical Limitations 1163 | IJ Technical Limitations 1164 |

| Marking Option One-Part Label (OPL) 2809 | Marking Option Two-Part Label (TPL) 2810 |
|---|---|
| OPL Technical Limitations 1188 | OPL Technical Limitations 1189 |

FIG. 3

FWD Rotary Wing Blade
118P229-71
Common Name: FWD Blade

CH88-PM-07-888A
Date:   12-May-2005

Other Part Numbers:
None

ANALYSIS LABELING PROCEDURE

1. General guidance and installation procedures are contained in CH88-PM-00-000.
2. Label Determined: 2-Part Label
3. Label Location: Place the labels on the damper attachment lug.
4. The photo below indicates the label locations.
5. Special Instructions: N/A Special Installation Instructions
N/A Photograph

Enter Decision for PN: 1200

Suggested Order 1202
Ink Jet, Dot Peen, Chemical Etch

DPM Technique for 1204
Part Number

Common Name 1205

DPM Techniques Advantages and Limitations 1208

Laser Bond 1210 | Ink Jet 1211 | Chem Etch 1212 | Dot Peen 1213

Marking Decision
1288  V

FIG. 19

Laser Bonding — 1300

Advantages — 1302
- Resistant to high heat
- Unaffected by Salt Fog/Spray
- Best Resolution
- Consistent Marking Process
- Non-Contact Application

Limitations — 1304
- Limited to Work Enclosure
- Cannot Mark on a Painted Surface
- Time Intensive

FIG. 20

PARTS MARKING SYSTEM AND METHOD

CROSS REFERENCE TO RELATED APPLICATION

This application is a continuation of and claims priority to U.S. patent application Ser. No. 11/252,408, entitled "Parts Marking System and Method" filed on Oct. 17, 2005 which is a continuation-in-part of U.S. patent application Ser. No. 11/818,964 filed on Oct. 15, 2005 and entitled "Parts Marking System and Method," which claims the benefit of U.S. Provisional Patent Application Ser. No. 60/619,489 filed on Oct. 15, 2004 and entitled "Parts Marking System and Method," each of which are incorporated herein by reference.

BACKGROUND

Oftentimes, large entities, e.g., a government or a large corporation, manage and maintain numerous assets such as fleets of vehicles or other heavy equipment, e.g., delivery trucks or tanks. In so managing and maintaining, these large entities sometimes find it difficult to gather and retain complete and reliable information for life cycle management of property and equipment. Thus, such entities are oftentimes unable to determine that all assets are reported, verify the existence of inventory, substantiate the amount of reported inventory and property, or optimally use historical information for physical asset management.

In light of the foregoing, it is difficult for the large entities to achieve goals of financial reporting and accountability, e.g., legislative goals set for government entities related to financial reporting, accountability, and life cycle management. In this regard, the entities are oftentimes unable to know the quantity, location, condition, and value of assets it owns, safeguard its assets from physical deterioration, theft, loss, or mismanagement, prevent unnecessary storage and maintenance costs or purchase of assets already on hand, and determine the full costs of programs that use these assets, e.g., government programs.

Thus, it is possible that those who manage government assets are not receiving accurate information for making informed decisions about future funding, oversight of federal programs involving inventory, and operational readiness.

As an example, each vehicle in a large fleet is made up of a plurality of parts, each of which is owned and inventoried by the entity. However, information related to parts used in maintenance or parts that are already installed on vehicles can be difficult to track.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 3 depicts exemplary marking options for use in the PMS of FIG. 1

FIG. 11 is a depiction of an exemplary report generated by the parts marking system of FIG. 2.

Figure 12:
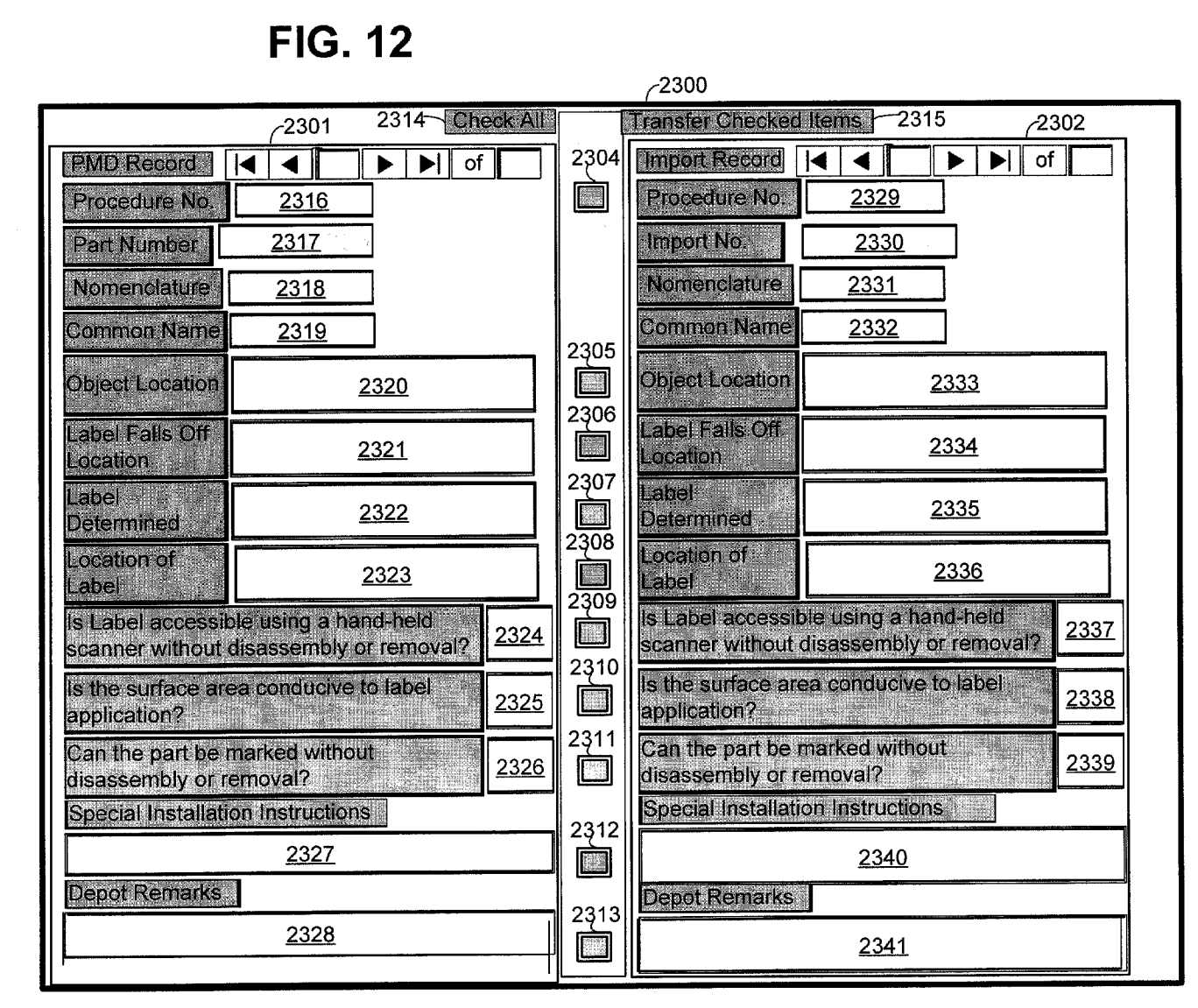

FIG. 12 is a depiction of an exemplary "Import Data" GUI of the parts marking system of FIG. 2.

FIG. 19 is a depiction of an exemplary "Enter decision" GUI of the parts marking system of FIG. 2.

FIG. 20 is a depiction of an exemplary advantages versus limitations GUI corresponding to laser bonding of the parts marking system of FIG. 2.

SUMMARY

A parts marking system in accordance with an exemplary embodiment of the present disclosure has memory for storing data indicative of at least one algorithm associated with at least one object material and logic configured to display the at least one algorithm to a display device and receive a user input for at least one part in response to the displayed algorithm.

A parts marking method in accordance with an exemplary embodiment of the present disclosure comprises the steps of storing data indicative of at least one algorithm associated with at least one object material and displaying the at least one algorithm to a display device. The method further comprises receiving a user input for at least one part in response to the displayed algorithm.

DETAILED DESCRIPTION

Embodiments of the present disclosure generally pertain to parts marking systems and methods. Specifically, a parts marking system (PMS) of the present disclosure facilitates making optimal choices regarding the application of an identifier on a part, hereinafter referred to as an "object identifier" (OD, and the object identifier's location on the part. Furthermore, the system facilitates in identifying a technically appropriate parts marking application. Exemplary types of marking applications include, but are not limited to labels, dot peen (DP) marking, laser bond (LB) marking, ink jet (IJ) marking, and chemical etching (CE). Note that such list is not exhaustive and other parts marking applications in other embodiments are possible. Note that label refers to any article that can be attached to an object for identification or description purposes, e.g., a slip, a tag, a data plate, or tape.

When determining whether a label is technically appropriate for a part and determining what type of label is technically appropriate for the part, an exemplary PMS is used to perform a label analysis. A label analysis, among other things, includes identifying functions, functional failures, failure modes, failure effects, and consequences associated with each label analysis. Notably, the PMS provides a proactive analysis technique that enables the identification of plausible failure modes related to marking a part with a particular label, so that appropriate action can be identified to manage the consequences of such plausible failure modes.

Furthermore, when determining whether a direct parts marking (DPM) application, e.g., DP marking, LB marking, IJ marking, or CE is technically appropriate, an exemplary PMS is used to facilitate a direct parts marking (DPM) analysis. In the DPM analysis, the PMS facilitates selecting options corresponding to particular technical limitations associated with available parts marking applications. Whether a parts marking application is technically appropriate for a particular part depends on a plurality of factors, which are described further herein.

Figure 1:
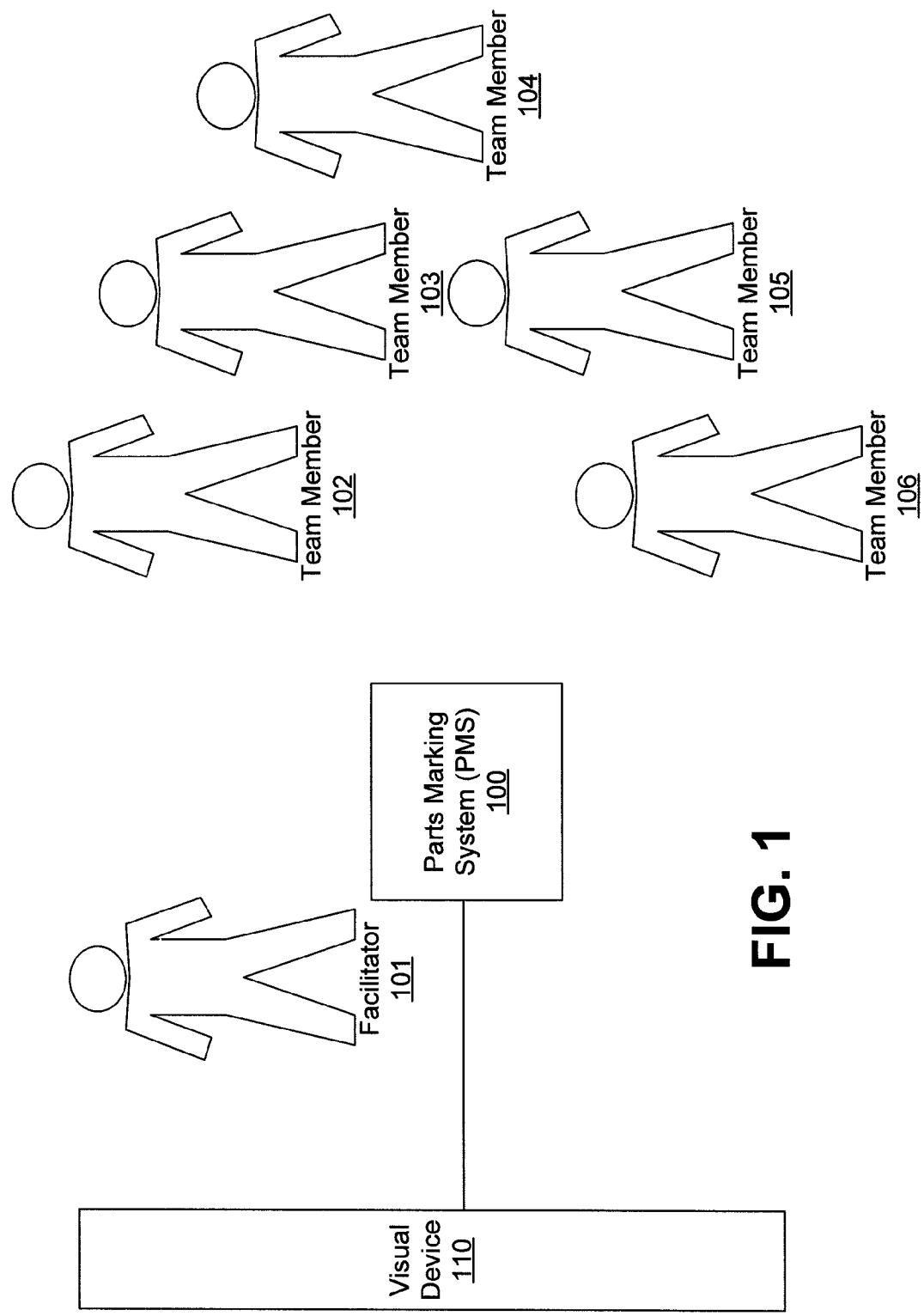
FIG. 1 is a block diagram illustrating a part marking system (PMS) in accordance with an exemplary embodiment of the present disclosure.

FIG. 1 illustrates a PMS 100 in accordance with an exemplary embodiment of the present disclosure. Prior to beginning a parts marking analysis using the PMS 100 in accordance with an exemplary embodiment, a facilitator 101 and any required team members gather implementation strategy data related to the types of parts that are to be marked, the kinds of materials that the parts will consist of, entity restraints related to the marking of parts, e.g., government regulations or corporate guidelines, monetary factors related to the marking of parts, safety factors, whether the entity desires to track particular parts, and the like. In addition, technical limitations corresponding to specific equipment that may be used to perform DPM techniques is gathered. Such list is not exhaustive, and other types of factors may be considered in other embodiments.

The PMS 100 is then configured to reflect such gathered information, which will now be described in more detail with reference to FIGS. 2-4.

After the PMS system 100 is configured according to the implementation information and strategies, the facilitator 101 gathers with a plurality of team members 102-106. The facilitator 101 requests data identifying a part for analysis, which is described in more detail hereafter, and the facilitator 101 queries the team members 102-106 in accordance with the implementation strategy data with which the PMS system 100 was configured. In this regard, the PMS system 100 provides a plurality of options from which the facilitator 101 may select corresponding to particular factors, as described herein, related to the implementation strategy. The team members 102-106 preferably communicate data corresponding to such requests to the facilitator 101. The number of team members 102-106 shown in FIG. 1 is merely an exemplary number and other numbers of team members are possible in other embodiments.

Notably, the facilitator 101 leads a parts marking analysis for an identified part(s) by requesting particular data from the team members 102-106 associated with the implementation strategies. In particular, the facilitator 101 and the team members 102-106, hereinafter referred to as the PMS team, perform a parts marking analysis so that an optimal marking application and marking location for the identified part is achieved.

As the facilitator 101 queries the team members 102-106, the team members 102-106 provide information corresponding to the queries of the facilitator 101. The facilitator 101 enters data or selects displayed options corresponding to the information provided from the team members 102-106 into the PMS 100. Furthermore, as the facilitator 101 enters the data into the PMS 100, the PMS 100 communicates the entered data to the visual device 110. Such process is described in more detail throughout the present disclosure.

The team members 102-106 preferably comprise a group of individuals who are knowledgeable in a particular technical area directly related to the identified part. For example, if the part that is the subject of the analysis pertains to the aerospace industry, the team members 102-106 may comprise a system engineer, a mechanic, a depot representative, a person responsible for technical publications, a maintenance test pilot, an instructor pilot, a crew member, and/or an original equipment manufacturer (OEM). Such a team comprising the members 102-106 provides a knowledge base relative to the technical area that is being analyzed. Note that the depot is a maintenance area, where particular pieces of equipment are taken, for example, to be overhauled or repaired.

During the course of an analysis by the team members 102-106 and the facilitator 101 using the PMS 100 of the present disclosure, there may be required data identified during the analysis that the team members 102-106 are unable to provide. In such a scenario, the PMS 100 retains information corresponding to the data needed for a complete analysis, so that such data may be sought from other sources, e.g., other experts not on the team.

Prior to initiating the parts marking analysis, the facilitator 101 preferably compiles implementation information and strategies related to a plurality of assets and corresponding parts. Thus, some information related to such parts is already stored in the PMS. For example, the implementation information and strategies may identify a list of parts that are to be marked, including part numbers, common names for the parts, nomenclature related to the parts, and the like. Additionally, the implementation information and strategies may include a list of marking equipment available, for example, dot peen equipment, laser-bonding equipment, chemical etching equipment, and/or ink jet equipment. The marking equipment information may further comprise technical limitations associated with the marking equipment available. Additionally, there may be desired factors associated with marking the selected parts. For example, an entity may desire to mark all parts that cost more than $10,000, mark each part that may result in safety consequences if the part fails, mark each part that may result in environmental consequences if the part fails, or mark each part that the entity desires to track generally. Note that the options for inclusion in the parts marking implementation and strategies noted above are merely exemplary. Such information and strategies may change and adapt depending upon the use of the PMS 100.

The parts marking analysis preferably comprises numerous parts. For example, the analysis might comprise a label analysis for determining the physical aspects of the label, i.e., one-part label, two-part label, and/or other type of label known in the art and for determining if a label is a possible marking technique for a particular part. Further, the PMS team populates an information worksheet, which includes functions, functional failures, failure modes, and failure effects, as described hereinabove, and a label consequences analysis to determine the consequences of a label falling off of a particular location. Furthermore, the PMS team might analyze the use of DPM for a particular part, including separately analyzing the use of a particular DPM technique for each part.

Figure 2:
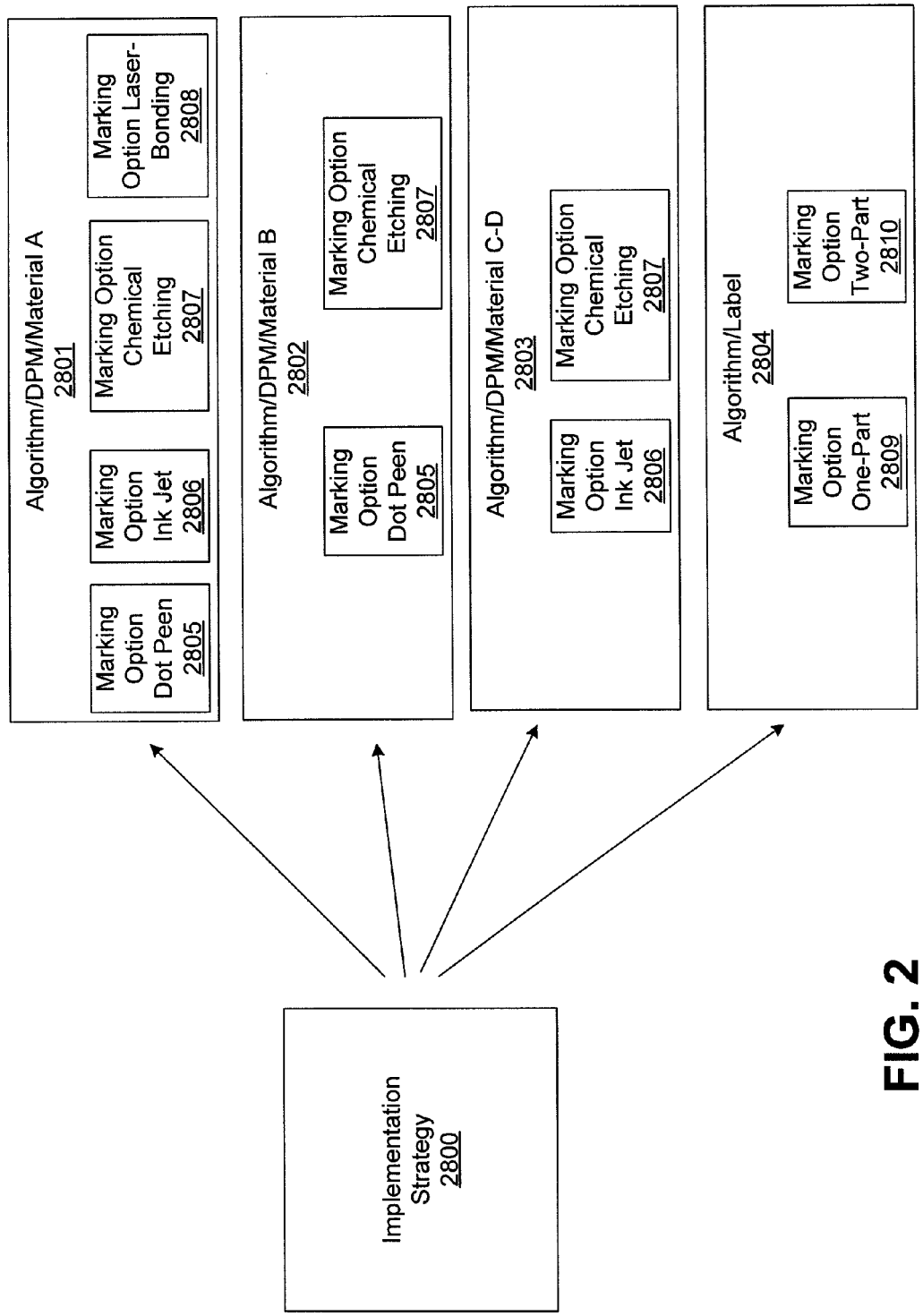
FIG. 2 depicts exemplary implementation data, algorithms, and marking options for use in the PMS of FIG. 1

FIG. 2 further illustrates how the PMS 100 uses a portion of the implementation strategy data 2800 that is gathered by the facilitator 101 or other individual(s). As described herein, the PMS 100 is to be used by the facilitator 101 and the PMS team to determine how a part will be marked, e.g., a label or via DPM, the location on the part where the part will be marked, and marking instructions technically appropriate for each part.

Further as described herein, the implementation strategy data 2800 comprises data indicating the types of DPM equipment that will be used and the type of labels that may be used to mark particular parts. Furthermore, the implementation strategy data 2800 may comprise data defining the technical limitations of the DPM equipment and/or the technical limitations of the labels. For example, some DPM techniques may only be able to be used on certain types of metals, e.g., aluminum or titanium, or some labels may not be applicable to a part because of the label's technical limitations, e.g., the label's size or the type of adhesive that is used on a particular label.

Therefore, the PMS 100 is configured such that marking options identified in the implementation strategy data 2800 are those desired by the implementing entity, mandated by the available equipment, or necessary for a particular part material and are available for selection by the facilitator 101 as identified by the PMS team. Data that may be identified in implementation information and strategies and used to configure the PMS system 100 will be identified throughout.

As shown in FIG. 2, the implementation strategy data 2800 is preferably used to generate a plurality of algorithms 2801-2804. An "algorithm" in this disclosure is a compilation of technical limitations associated with one or more particular parts marking techniques, and the technical limitations may be expressed in the form of questions having selectable options, e.g., yes/no, 1/0, or the like. The algorithms 2801-2804 are generated based upon the implementation information and strategies, including the type of mark, e.g., label or DPM and the type of equipment that will be used to adhere the mark to the part or directly mark the part in order to determine one or more technically appropriate marking techniques.

Therefore, an exemplary algorithm 2801 may be generated for determining a technically appropriate DPM technique for a part consisting of a particular material, "Material A," where a plurality of options is available. Note that exemplary materials might be, for example, aluminum, titanium, rubber, composite, or the like. Such list is exemplary, and other types of materials are possible in other embodiments.

For example, the algorithm 2801 indicates that for DPM for a part consisting of Material A, the following marking techniques are available, including a "Dot Peen Marking Option" 2805, an "Ink Jet Marking Option" 2806, a "Chemical Etching Marking Option" 2807, and a "Laser-Bonding Marking Option" 2808. As will be described further herein, while each of these techniques may be available, the parts marking analysis will further indicate, based upon any technical limitations of the equipment or the technique, which of the marking options 2805-2808 is technically appropriate for the particular part.

In another example, the exemplary algorithm 2802 may be generated for determining a technically appropriate DPM technique for a part consisting of a particular material, "Material B," where only two marking options are available. Notably, the algorithm 2802 indicates that the "Dot Peen Marking Option" 2805 and the "Chemical Etching Marking Option" 2807 are technically possible for "Material B" and so is available for analysis. As described herein, while each of these techniques may be available, the parts marking analysis will further indicate, based upon any technical limitations of the equipment or the technique, which of the marking options 2805 and/or 2807 is technically appropriate and therefore possible for the particular part.

In another example, the exemplary algorithm 2803 may be generated for determining a technically appropriate DPM technique for a part consisting either of "Material C" or "Material D." In this regard, a particular algorithm 2803 may be used for parts consisting of different kinds of metals. For example, the algorithm 2803 may be used to analyze parts consisting of titanium or consisting of aluminum. The algorithm 2803 indicates two available marking options "Ink Jet" 2806 and "Chemical Etching" 2807.

In another example, the exemplary algorithm 2804 may be generated for determining a technically appropriate label for a part. In this regard, a particular algorithm 2804 may be used to determine whether a "One-Part Label Marking Option" 2809 or a "two-part Label Marking Option" 2810 is desirable. As described further herein, such an algorithm 2804 for determining whether a label should be used and what type of label should be used may include a failure modes and effects analysis, as described further herein.

FIG. 3 further describes the marking options 2805-2810. In this regard, each marking option that is available in a particular algorithm 2801-2804 (FIG. 2) further comprises a plurality of technical limitations 1161-1164 and 1188-1189. For example, the "Dot Peen Marking Option" for a particular metal, e.g., aluminum, may only be plausible if the part under analysis is less than or equal to "54" on the Rockwell Hardness C-Scale, if the part is not used in a high pressure operating context, or the part is greater than 0.020 inches thick. Thus each of the foregoing is a "DP Technical Limitation" 1161 corresponding to the particular marking option, e.g., dot peen. Such technical limitations are preferably displayed to the facilitator 101 and/or PMS team in the form of questions and/or statements, which is described in more detail with reference to FIG. 18. Such technical limitations may be associated with a plurality of options for the user to select, e.g., yes/no if the limitation is in the form of a question. Further, however, some technical limitations may be in the form of a statement, and the facilitator 101, with input from the PMS team, enters data addressing such statement. For example, the One-Part Label Technical limitations 1188 may comprise data indicative of failure modes and effects analysis. Technical limitations are described further here.

Furthermore, in each algorithm 2801-2804 there may be general limitations related to DPM. For example, DPM may not be possible if the surface roughness is not between 8 and 250 micro-inches, which may be a general technical limitation to using DPM. Thus, if the marking area can not be prepared for DPM applications, then DPM may not be technically appropriate at all for the particular part and thus not available to the PMS team as a marking option.

Figure 4:
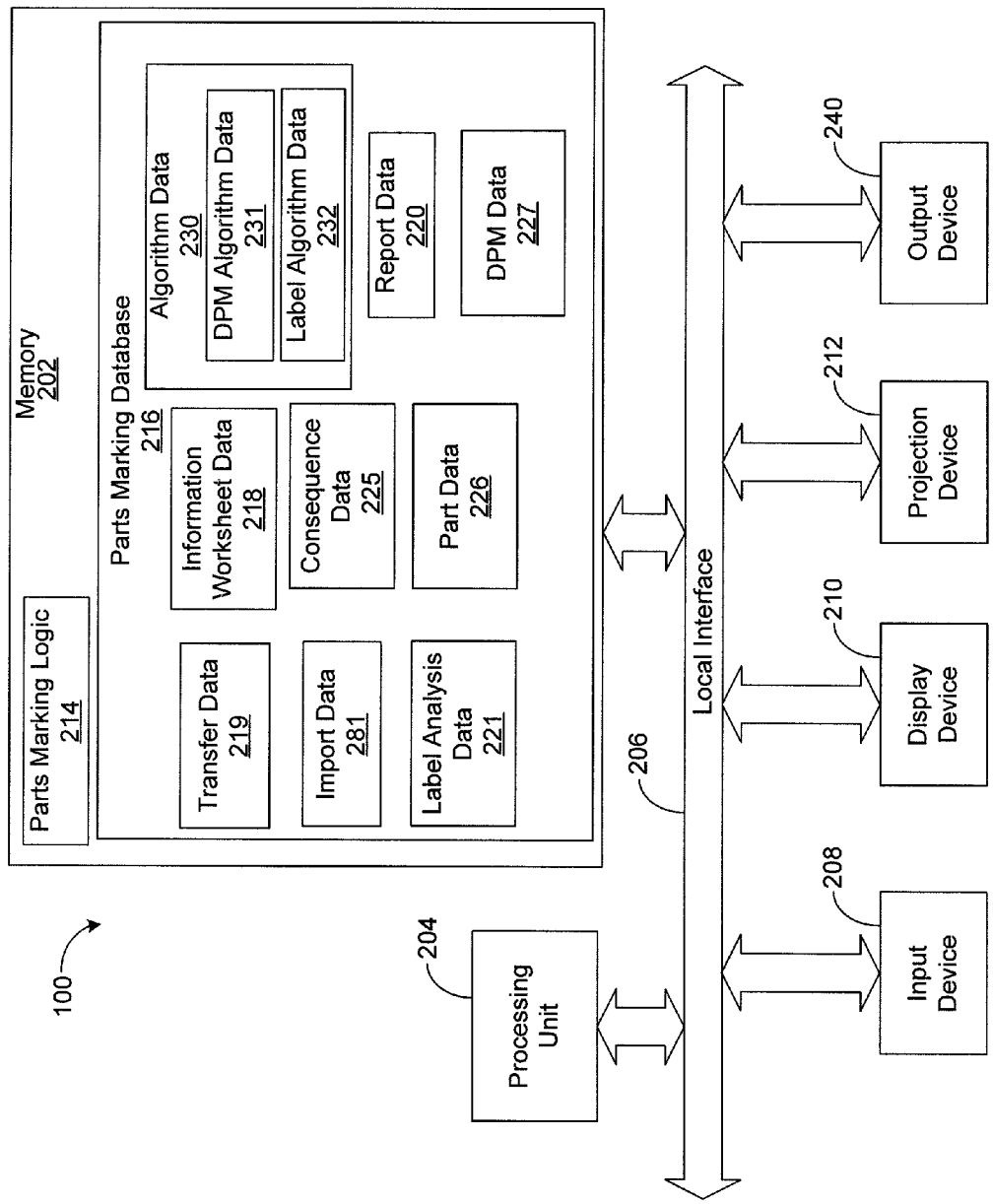
FIG. 4 is a block diagram illustrating a more detailed depiction of the parts marking system of FIG. 1.

FIG. 4 depicts a PMS 100 in accordance with an exemplary embodiment of the present disclosure. The exemplary PMS 100 generally comprises a processing unit 204, an input device 208, a display device 210, a projection device 212, and an output device 240.

The PMS 100 further comprises parts marking logic (PML) 214 and a parts marking database (PMD) 216. The PMD 216 comprises part data 226, information worksheet data 218, consequence data 225, label analysis data 221, report data 220, transfer data 219, import data 281, DPM data 227, and algorithm data 230. The algorithm data 230 further comprises DPM algorithm data 231 and label algorithm data 232. Each is described further herein.

In the exemplary PMS 100 shown by FIG. 4, the PMD 216 and the PML 214 are implemented in software and stored in memory 202. In other embodiments, any of the foregoing components may be implemented in hardware and/or a combination of hardware and software.

The processing unit 204 may be a digital processor or other type of circuitry configured to run the PML 214 and/or other software components of the PMS 100 by processing and executing the instructions of such components. The processing unit 204 communicates to and drives the other elements within the PMS 100 via a local interface 206, which can include one or more buses. Furthermore, an input device 208, for example, a keyboard, a switch, a mouse, and/or other types of interfaces, can be used to input data from a facilitator 101 of the PMS 100, and display device 210 can be used to output data to the facilitator 101 (FIG. 1).

The PMS 100 may further comprise a projection device 212 that can be connected to the local interface 206. The projection device 212 may capture information that the facilitator 101 enters into the PMS 100 via the input device 208. An exemplary input device 208 may include, but is not limited to, a keyboard device, serial port, scanner, camera, microphone, or local access network connection. An exemplary display device 210 may include, but is not limited to, a video display.

As noted herein, various components, such as the PML 214 and the PMD 216, are shown in FIG. 2 as software stored in memory 202. Such components can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

As described hereinabove, portions of the data, including the algorithm data 230 and a portion of the part data 226, may be pre-populated based upon the implementation information and strategies 2800 (FIG. 2). Thus, when a parts marking analysis begins, the facilitator 101 may request information identifying a part for analysis, and when the facilitator 101 enters such data, the PML 214 may retrieve data describing the part under analysis from the part data 225 and display the retrieved part data 225 to the display device 210 and the projection device 212. If the logic 214 does not locate data corresponding to the identified part in the part data 225, the facilitator 101 can add a new part to the part data 226 for analysis.

If the PMS team desires to perform a label analysis on the part, the facilitator 101 initiates a label analysis via the input device 208, which is described further herein, and the PML 214 displays label algorithm data 232 to the display device 210. As described hereinabove, the label algorithm data 232 may comprise a series of technical limitations in the form of questions. Further, the algorithm data 232 comprises selectable options corresponding to each of the technical limitations and may include a failure modes and effects analysis and a consequence evaluation, each of which is described further herein.

Thus, the facilitator 101 elicits selections corresponding to the label algorithm data 232 and the facilitator 101 enters such selections via the input device 208. The PML 214 stores such responses in label analysis data 221 for the identified part under analysis. In this regard, label analysis data 221 preferably comprises general data related to attaching a label or labels to the identified part. For example, the label analysis data 221 may comprise data indicative of whether the part is conducive to a two-part label or a one-part label described further herein. Such information is merely exemplary, and other label analysis data 221 is possible in other embodiments. The facilitator 101 enters label analysis data 221 via the input device 208, and the logic 214 stores such label analysis data 221 in memory 202.

Figure 15:
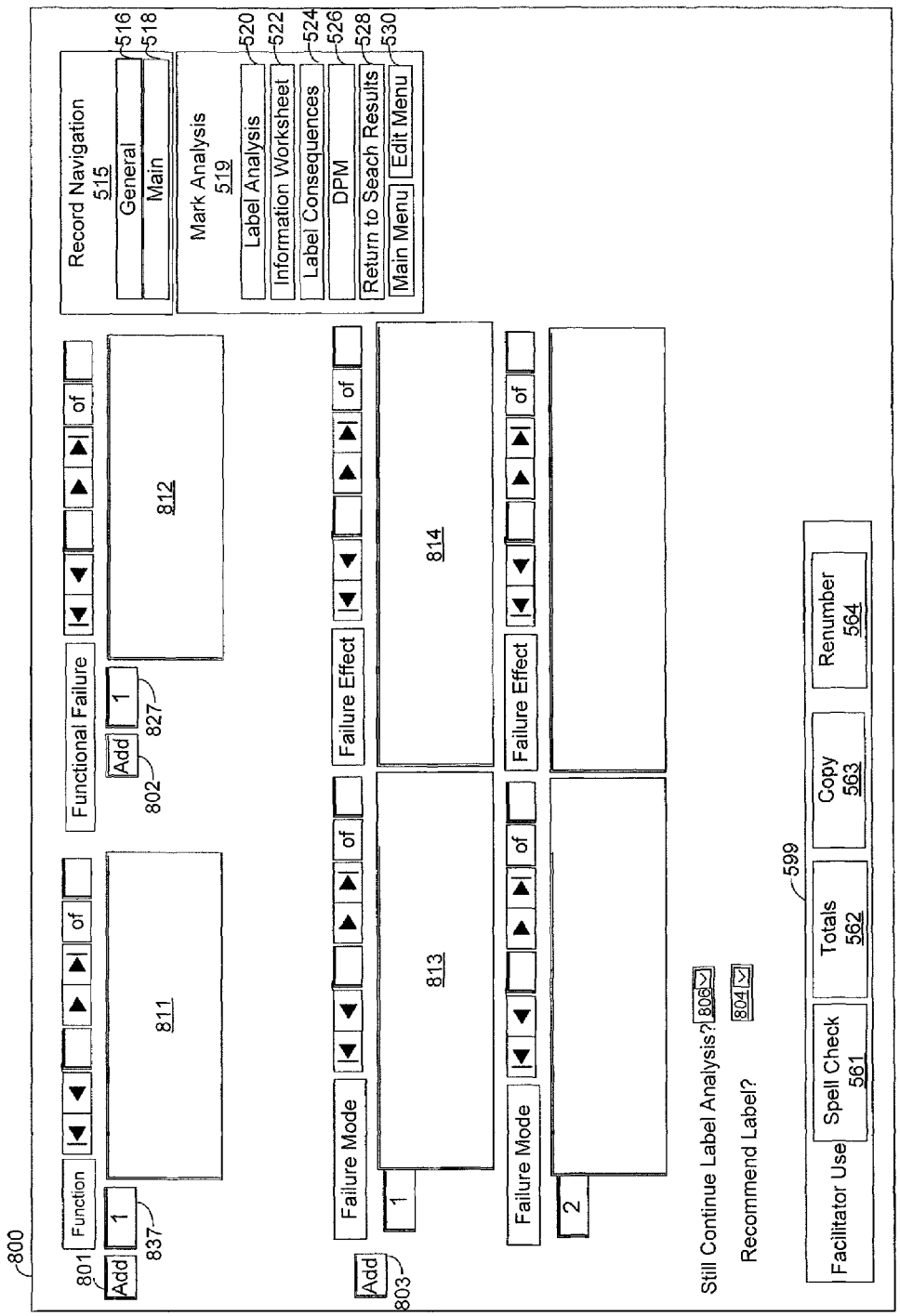
FIG. 15 is a depiction of an exemplary "Information Worksheet" GUI of the parts marking system of FIG. 2.

The facilitator 101 elicits information worksheet data 218 from the PMS team corresponding to the identified part. Information worksheet data 218 preferably comprises data identifying functions, functional failures, failure modes, and failure effects corresponding to attaching a label to the identified part. Information worksheet data 218 is described in more detail with reference to FIG. 15. The facilitator 101 enters Information worksheet data 218 via the input device 208, and the logic 214 stores such information worksheet data 218 in memory 202.

The facilitator 101 elicits consequence data 225 from the PMS team corresponding to the identified part. Consequence data 225 preferably comprises data detailing identified consequences of a label falling off of an identified part. Consequence data 225 is described in more detail with reference to FIG. 16. The facilitator 101 enters consequence data 225 via the input device 208, and the logic 214 stores such consequence data 225 in memory 202.

If the PMS team desires to perform a DPM analysis on the part, the facilitator 101 initiates DPM analysis via the input device 208, which is described further herein, and the PML 214 displays DPM algorithm data 231 to the display device 210. As described hereinabove, the DPM algorithm data 231 may comprise a series of technical limitations in the form of questions or statements. Further, the DPM algorithm data 231 comprises selectable options corresponding to each of the DPM technique technical limitations.

Thus, the facilitator 101 elicits selections corresponding to the DPM algorithm data 231 and the facilitator 101 enters such selections via the input device 208. As described hereinabove, the DPM algorithm data 231 comprises questions corresponding to the materials, environment, and DPM application limitations related to the part. The PML 214 stores such responses in DPM data 227 for the identified part under analysis. In this regard, DPM data 227 preferably comprises general data related to marking a part via one or more DPM techniques. For example, the DPM data 227 may comprise data indicative of whether the part is metallic or nonmetallic, whether the part is coated, and/or what type of metal makes up the identified part. DPM data 227 is described in more detail with reference to FIG. 17. The facilitator 101 enters DPM data 226 via the input device 208, and the logic 214 stores such DPM data 227 in the PMD 216 in memory 202.

As described hereinabove, the DPM algorithm data 231 preferably comprises specific inquiries for determining whether a part is conducive to a particular DPM application, i.e., chemical etching, laser bonding, ink jet marking, dot peen marking, etc. Further, the DPM algorithm data 231 comprises data indicative of which types of DPM techniques are identified for use in the implementation information and strategies for a particular implementing entity. Such data is used in order to configure the PMS 100 specific to each implementing entity, including options related to such inquiries as described hereinabove. DPM algorithm data 231 is described in more detail with reference to FIG. 18. The DPM algorithm data 231 is pre-populated in the PMS 100 prior to a parts marking analysis via the input device 208, and the logic 214 stores such DPM algorithm data 231 in memory 202.

Furthermore, data related to the parts marking analysis is stored in the PMD 216, and the PML 214 generates reports 220 corresponding to the data stored in PMD 216. For example, the PML 214 may generate a report detailing the status of a plurality of parts, e.g., whether the parts have been analyzed, whether an analysis of the parts has been sent to a validating authority, or whether the parts marking analysis and recommendations have been approved by an approval authority.

Figure 5:
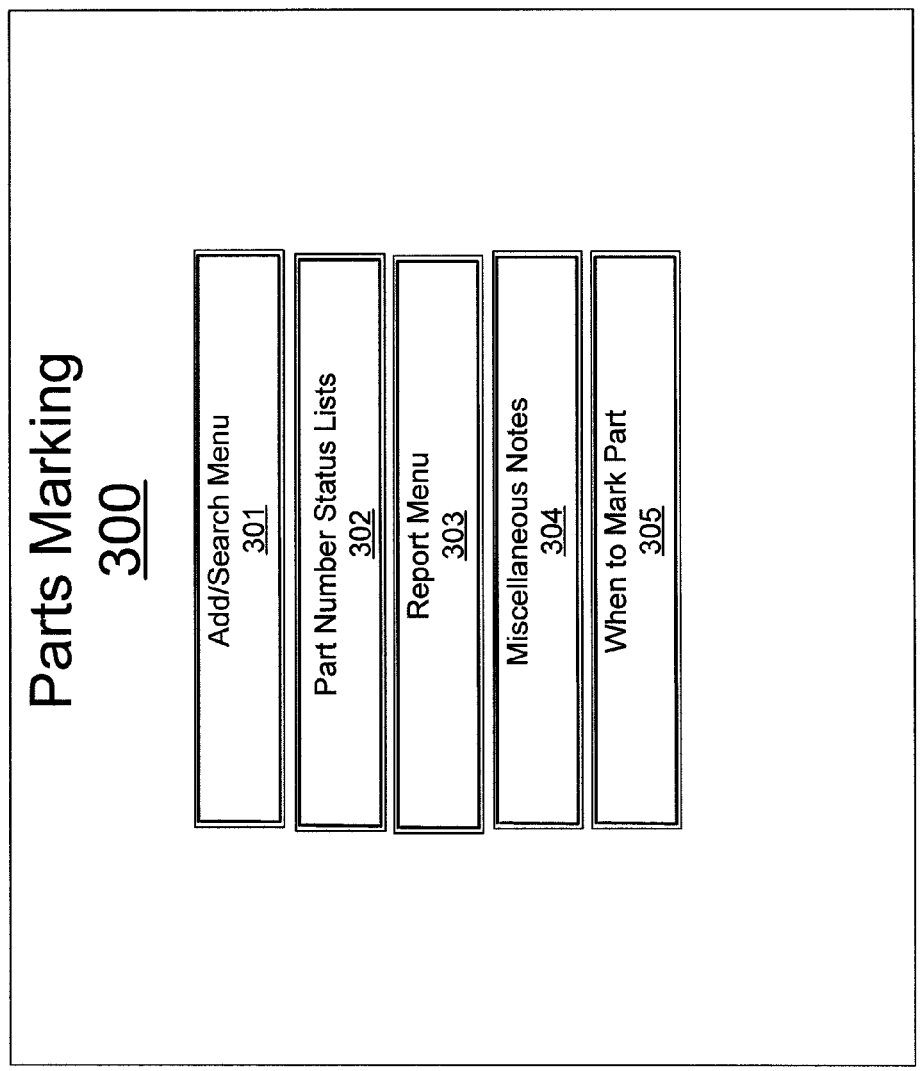
FIG. 5 is a depiction of an exemplary menu graphical facilitator 101 interface (GUI) of the parts marking system of FIG. 2.

FIG. 5 depicts a graphical user interface (GUI) 300 in accordance with an exemplary embodiment of the present disclosure.

The "Parts Marking" GUI 300 preferably comprises pushbuttons 301-305, and each button 301-305 displays a window, each of which is described further herein, when selected by the facilitator 101 (FIG. 1).

The "Add/Search Menu" pushbutton 301 enables the facilitator 101 to add a particular part and its associated data to the PMD 216 and navigate existing parts stored in the PMD 216. When the facilitator 101 selects the pushbutton 301, the PML 214 displays to the display device 210 an "Add/Search Menu" GUI 400, which is described in more detail with reference to FIG. 6.

The "Part Number Status Lists" pushbutton 302, when selected, displays a plurality of pushbuttons (not shown) that enable the facilitator 101 to retrieve lists of part numbers from the PMD 216 based on specific criteria. Thus, the pushbutton 302, when selected, displays a "Status Lists" GUI 1900, as depicted in FIG. 9.

Figure 9:
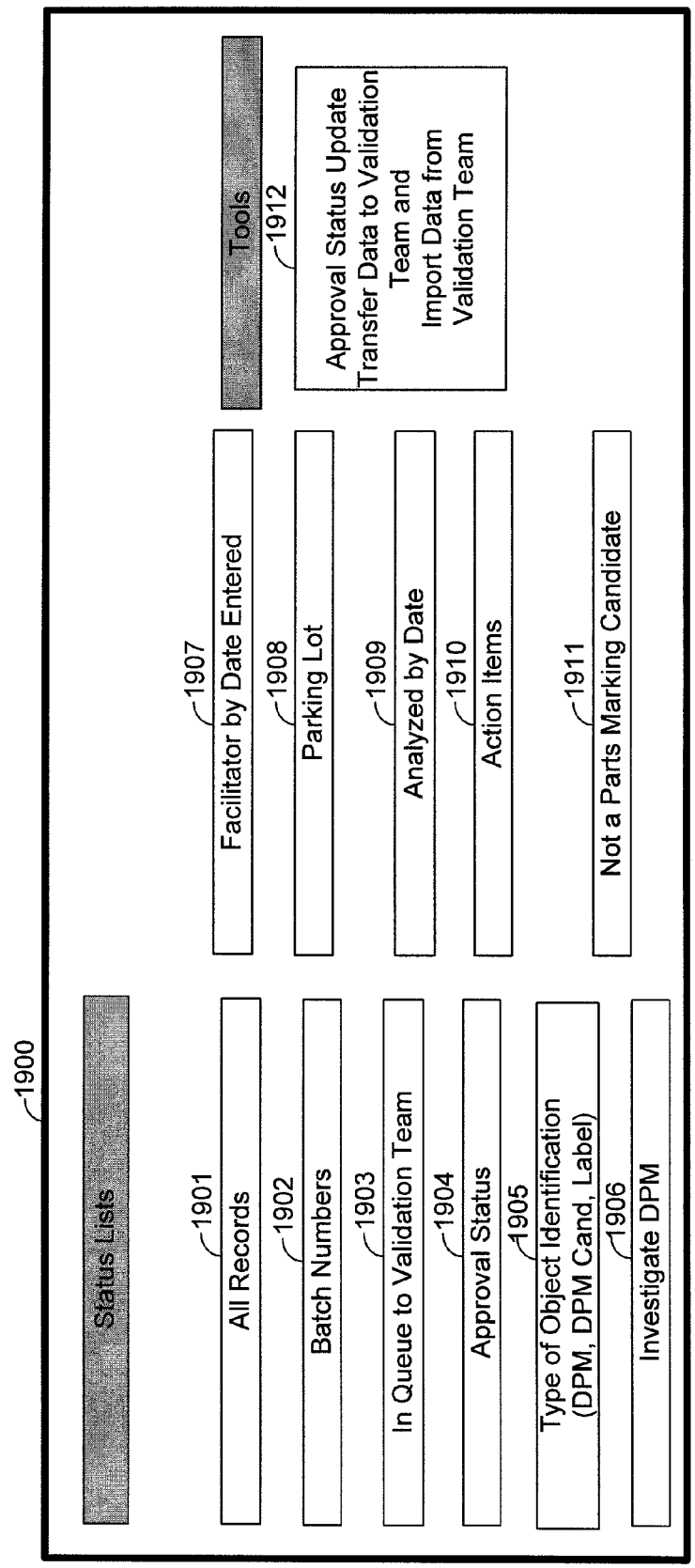
FIG. 9 is a depiction of an exemplary "Part Number Status Lists" GUI of the parts marking system of FIG. 2.

With reference to FIG. 9, the GUI 1900 enables a facilitator 101 to view a plurality of status lists corresponding to a part or a plurality of parts.

The GUI 1900 comprises pushbuttons 1901-1912. The "All Records" pushbutton 1901, when selected, displays a list of parts and corresponding parts marking information and where such part is in an approval process. As described further herein, the PMS 100 is used in order to generate parts marking procedures for a plurality of parts. Such procedures for marking the parts may undergo an approval process, e.g., the team generates the information, a validation team reviews the information, and an approval authority approves the information. Thus, the "All Records" pushbutton 1901 may further display where each part is in the approval process.

The "Batch Numbers" pushbutton 1902 may display, when selected, a window that enables a facilitator 101 to display a plurality of parts associated with a batch number. In this regard, the facilitator 101 may enter the batch number and all the parts associated with that batch number are displayed, including the parts' common names and approval status.

The "In Queue to Validation Team" pushbutton 1903 may display, when selected, a window that exhibits a list of parts that are to be sent to an approval authority, e.g., a second or third tier. In this regard, an analysis has been performed on the parts, and the parts and associated information are to be provided to another tier for validation. For example, the list may indicate part numbers, common names and nomenclature for those parts in queue to the validation team.

The "Approval Status" pushbutton 1904 may display, when selected, a window that exhibits a list of part numbers and their associated approval status when that status is chosen.

The "Type of Object Identification" pushbutton 1905 may display, when selected, a window that exhibits a list of parts and status by their associated type of object identifier, when that object identification is chosen. In this regard, parts may be listed indicating DPM, DPM candidate, or Label. Note that a DPM candidate refers to a part that is waiting for a DPM analysis to be performed.

The "Investigate DPM" pushbutton 1906 may display, when selected, a window that exhibits a list of parts that is waiting for a DPM analysis. In this regard, such a list comprises part numbers associated with parts that the PMS team desires to analyze for a DPM method.

Further lists that may be generated include a list of parts by date entered by selecting the "Facilitator by Date Entered" pushbutton 1907, a list of parts having parking lot data by selecting the "Parking Lot" pushbutton 1908, or a list of by analysis date by selecting "Analyzed by Date" pushbutton 1909. Furthermore, a facilitator 101 may generate a status list showing a list of parts having action items by selecting the "Action Items" pushbutton 1910, or a list of parts that are not parts marking candidates by selecting the "Not a Parts Marking Candidate" pushbutton 1911.

Figure 10:
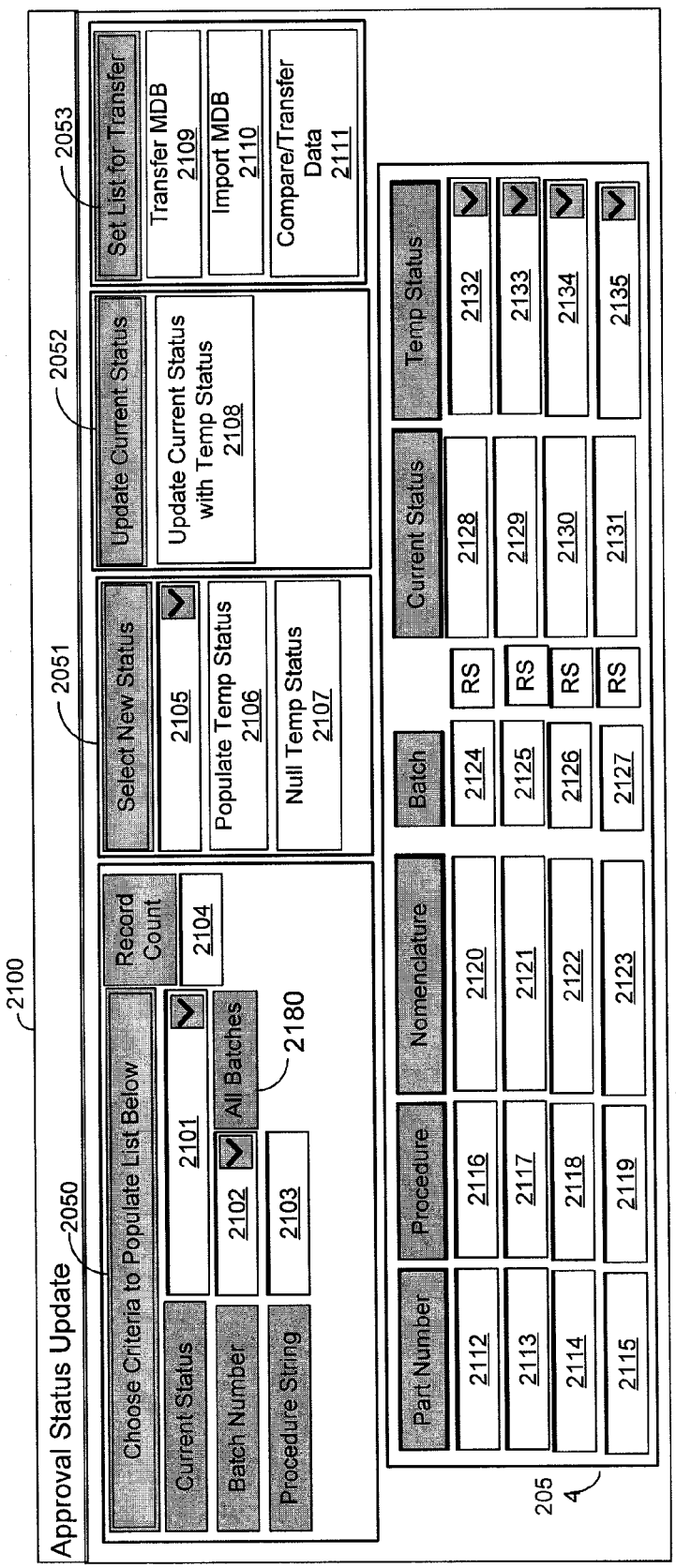
FIG. 10 is a depiction of an exemplary "Approval Status Update" GUI of the parts marking system of FIG. 2.

The GUI 1900 further comprises an "Approval Status Update; Transfer Data to Validation Team; Import Data from Validation Team" pushbutton 1912. When pushbutton 1912 is selected, a GUI 2100 is displayed as depicted in FIG. 10. The GUI 2100 enables a facilitator 101 to review data related to the status of a part or a batch of parts, change data related to the status of parts, and/or transfer data related to a part or a batch to a validation team or an approval authority, e.g., manager or the like, so that they can add to or comment on the data.

GUI 2100 comprises a "Choose Criteria to Populate List Below" menu 2050, a "Select New Status" menu 2051, an "Update Current Status" menu 2052, and a "Set List for Transfer" menu 2053.

The menu 2050 enables a facilitator 101 to display a part or a list of parts in the listing window 2054. In this regard, the menu 2050 comprises a text field 2101 for selecting data indicative of the current status of a part or a batch of parts. Thus, for example, if the facilitator 101 selects data indicative of a status "In Queue for Validation Team," as described hereinabove, then the PML 214 displays the parts in the window 2054 from the part data 226 associated with the status identifier entered by the facilitator 101. Note that the exemplary window 2054 lists the parts by part number and associated procedure number, nomenclature, batch number, and current status identifier. In addition, the facilitator 101 may retrieve parts for display in the window 2054 by selecting a batch number in text box 2102 or by entering a procedure string in text box 2103. The text box 2104 displays the total number of parts, i.e., records retrieved. Further pushbutton 2180, when selected, displays all part numbers associated with all batch numbers in the part data 226. For example, if text box 2101 indicated "In Queue to Validation Team" and the text field 2102 indicated batch number "3" for example, if the facilitator 101 selects "All Batches," then the PML 214 removes the "3" limitation on the search and displays all records from all batches that have a status of in queue to validation team.

Note that the window 2054 comprises a plurality of text boxes 2112-2115 for displaying part numbers retrieved based upon criteria entered in menu 2050. Only four text boxes 2112-2115 are shown for exemplary purposes. However, the number of text boxes 2112-2115 displayed will directly reflect the number of parts retrieved based upon the criteria entered. Furthermore, text boxes 2116-2119 display alphanumeric codes identifying parts marking procedure, text boxes 2120-2123 display nomenclature, text boxes 2124-2127 display batch numbers, and text boxes 2128-2131 display current status identifiers corresponding to the part number text boxes 2112-2115, respectively.

After the facilitator 101 has selected one or more parts for display to the window 2054, the facilitator 101 may then change the status of the parts listed. In this regard, the text boxes 2128-2131 display the current status of each part listed. The facilitator 101 may select a new status identifier, e.g., awaiting approval, or approved, and enter the new status in a text box 2105. The "Populate Temp Status" pushbutton, when selected, then populates "Temp Status" text boxes 2132-2135 with the new status selected in box 2105. Note that "Delete Temp Status" may be selected in order to delete the new status identifiers populated in the "Temp Status" text boxes 2132-2135.

Once the facilitator 101 has selected a status identifier for the "Temp Status" text boxes associated with each part, the facilitator 101 may then update the "Current Status" text boxes 2128-2131 by selecting the "Update Current Status with Temp Status" pushbutton 2108. When the facilitator 101 selects the pushbutton 2108, the PML 214 changes the data stored in the PMD 216 associated with the corresponding parts to reflect the new status identifier. In addition, the PML 214 also displays the new status identifiers to the current status text boxes 2128-2131.

The "Set List for Transfer" menu 2053 comprises three pushbuttons 2109-2111. When the "Transfer Database" pushbutton 2109 is selected, the PML 214 generates a transfer data 219 that the PML 214 stores in memory 202, as described herein. In this regard, the PML 214 retrieves data describing the parts associated with the part numbers displayed in window 2054. The PML 214 then generates the PMD 219.

The GUI 2100 may further comprise a pushbutton (not shown) that, when selected, displays a window (not shown) for receiving recipient information, e.g., email address or web site address. Thus, the facilitator 101 may then select a transfer button (not shown) based upon the recipient information entered, and the PML 214 transmits the PMD 219 to the recipient. Thus, the listed parts and associated parts marking data making up a record in the PMD 216 may be transmitted to a validation team and/or an approving authority for review, as described herein.

In addition, the GUI 2100 comprises an "Import Database" pushbutton 2110. When the pushbutton 2110 is selected, the PML 214 may retrieve import data 281 and store the import data 281 in the PMD 216. The PMS 100 may receive import data 281 from a validation team and/or an approving authority, and the received import data 281 may comprise changes to a previous transfer data 219.

Thus, the GUI 2100 further comprises a "Compare/Transfer Data" pushbutton 2111. When the pushbutton 2111 is selected, the PML 214 displays a window 2300 as depicted in FIG. 5F.

The GUI 2300 displays a window 2301 populated with data related to a part number currently stored in the PMD 216. Furthermore, the GUI 2300 displays a window 2302 populated with data related to the same part number, however, the data displayed is retrieved from the imported database 219. The GUI 2300 further comprises check boxes 2304-2313 corresponding at least a portion of the data contained in each of the "PMD Record" 2301 and the "Import Record 2302." Note that the records 2301 and 2302 have a plurality of text fields 2316-2328 and 2329-2341, respectively.

When a facilitator 101 desires to transfer augmented data from the "Import Record" 2302 to the "PMD Record" 2301, facilitator 101 selects a check box 2304-2313 corresponding to that portion of the data 2316-2328 and 2329-2341 that the facilitator 101 desires to transfer and selects the "Transfer Checked Items" pushbutton 2315. The PML 214 then replaces the data related to the data checked in the PMD for the currently displayed part number data in the "Import Record" 2302. Additionally, the facilitator 101 may select the "Check All" pushbutton to move all the data in the "Import Record" 2302 to the "PMD Record" 2301.

The "Report Menu" pushbutton 303 enables the facilitator 101 to request reports 220 from the PMD 216 corresponding to the PMD 216 and the algorithmic data 230 described further herein. When the facilitator 101 selects the pushbutton 303 from the GUI 300, the PML 214 displays to the display device 210 a list of reports that the PML 214 can create or has already created. Thus, the facilitator 101 can retrieve a report and display it to display device 210 or print the report to an output device 240 or display such report to the display device 210 or visual device 110.

An exemplary report 2400 is illustrated in FIG. 11. The report 2400 depicts a label procedure report for a part named "FWD Rotary Wing Blade." The report 2400 provides the part number "118P229-71," a common name "FWD Blade," a procedure number "CH88-PM-07-888A," and a date "12 May 2005."

Additionally, the report 2400 provides a labeling procedure including the type of label, "2-Part Label," and a label location, "on the damper attachment lug." The report further exhibits a photograph or drawing that may show the label location and the placement on the part and any special installation instructions.

The "Miscellaneous Notes" pushbutton 304 may display a window (not shown) that enables the facilitator 101 to enter notes regarding a particular part of analysis.

Figure 7:
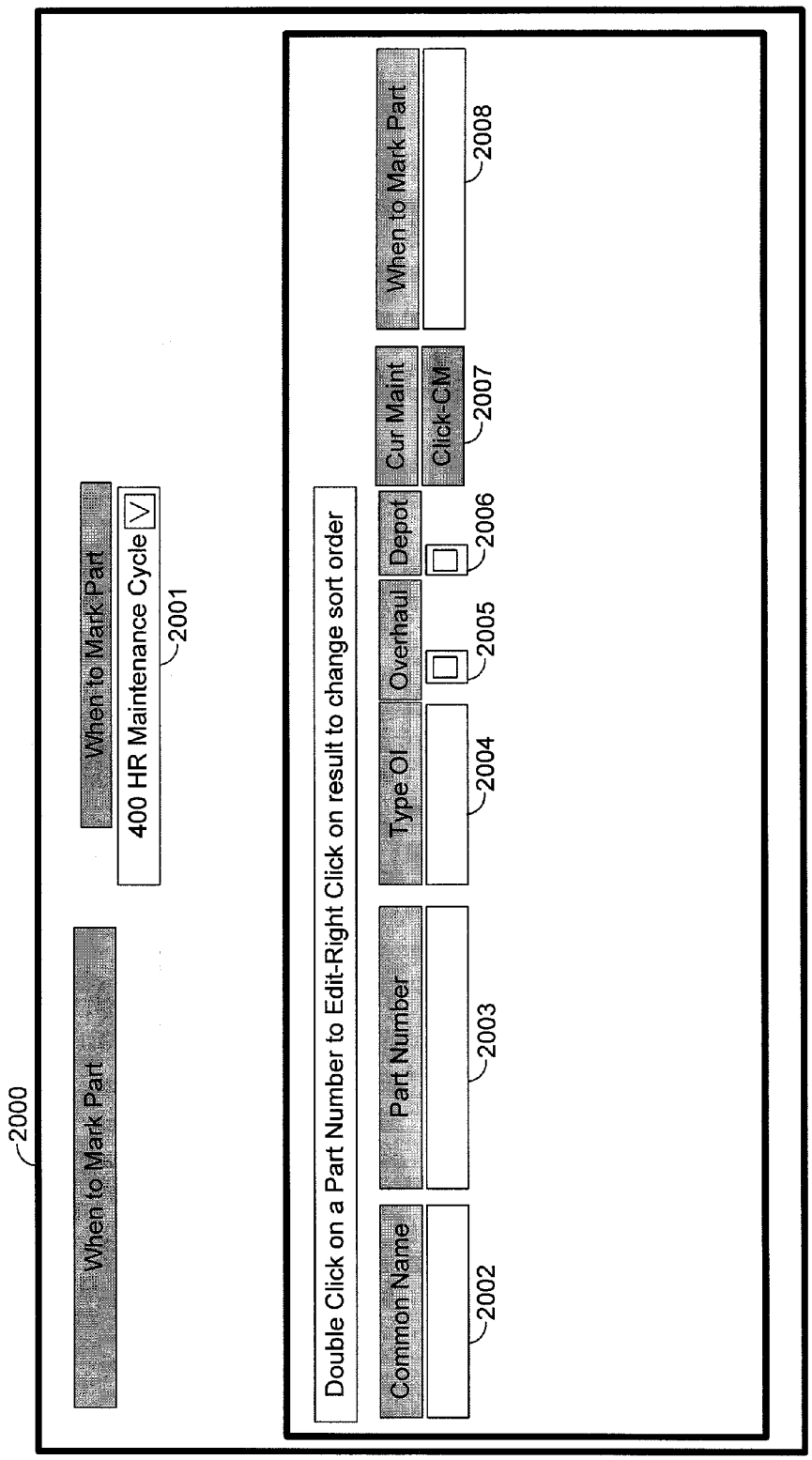
FIG. 7 is a depiction of an exemplary "When to Mark Part" GUI of the parts marking system of FIG. 2.

The "When to Mark Part" pushbutton 305 displays a GUI 2000 depicted in FIG. 7 when selected. The GUI 2000 enables a facilitator 101 and/or the PMS team to determine/view when a part is to be marked. In this regard, the GUI 2000 comprises a pull down menu 2001 that the facilitator 101 can use to select a particular "When to Mark Part" opportunity and thus the PML 214 displays the parts to be marked at that time. For example, the facilitator 101 may choose "400 HR Maintenance Cycle" and thus the PML 214 displays the parts that have been identified to be marked at the 400 HR Maintenance Cycle. GUI 2000 further comprises a "Common Name" text box 2002 that displays the common name of the part, a "Part Number" text box 2003 that displays the part number of the part, and a "Type OI" text box 2004 that displays the type of object identifier, e.g., a label or particular DPM technique, chosen by the PMS team to be used to mark the part. In addition, the GUI 2000 comprises check boxes 2005 and 2006 that indicate if the part is subject to overhaul or to be at the depot, respectively. Additionally, a "Click-CM" pushbutton, when selected, displays a current maintenance schedule for the part. The GUI 2000 also displays in text box 2008 that allows the facilitator 101 and the PMS team to choose or view when the part is to be marked based on the opportunities shown in 2005, 2006, and 2007.

As mentioned hereinabove, when the facilitator 101 selects the pushbutton 301 (FIG. 5), the PML 214 displays the GUI 400 (FIG. 6) to the display device 210. The GUI 400 comprises a text box 402 in which the facilitator 101 may enter data, via the input device 208, indicative of a part number. After the facilitator 101 has entered the text into the text box 402, the facilitator 101 selects a "Click to Add" pushbutton 414.

Figure 8:
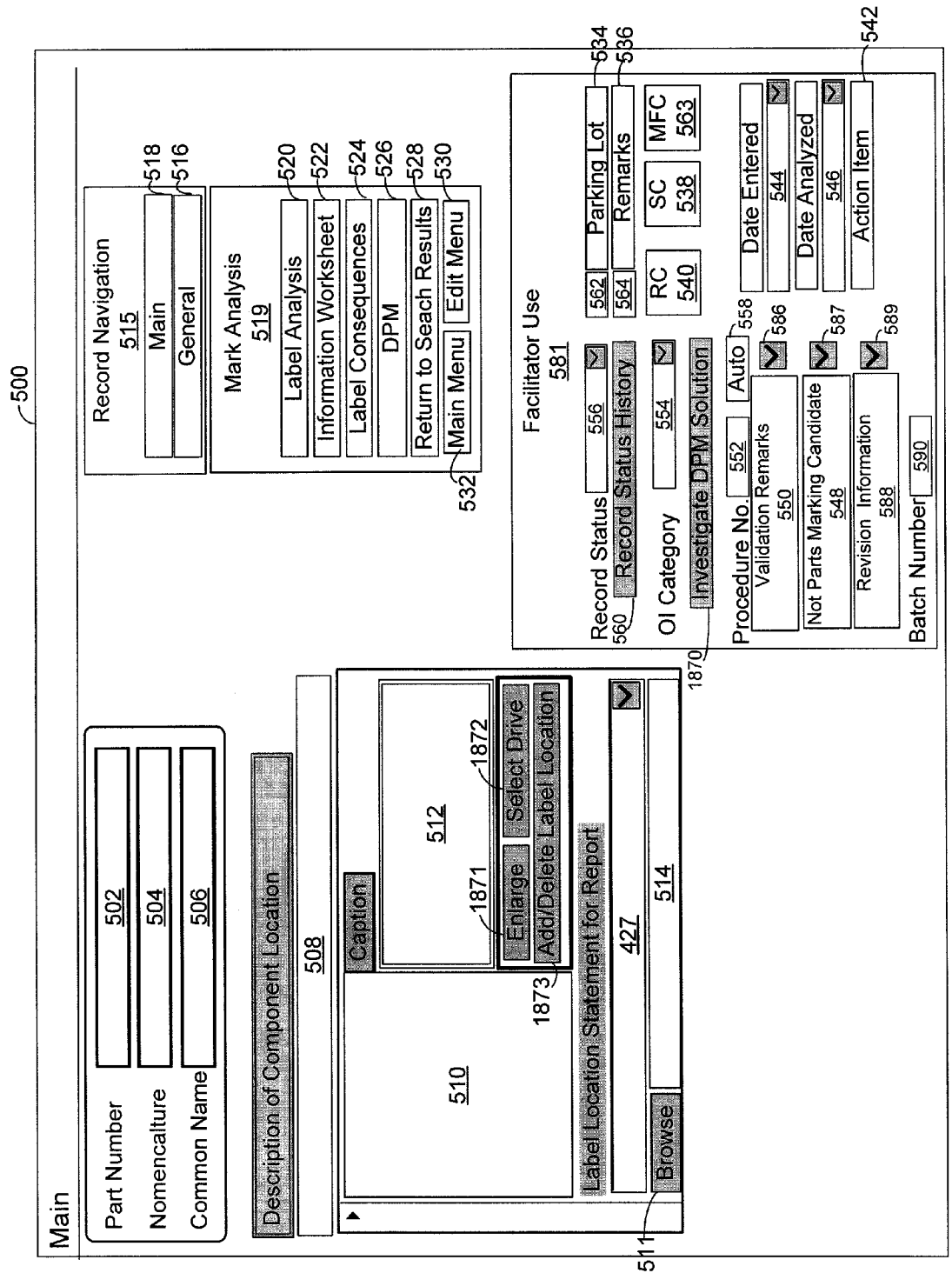
FIG. 8 is a depiction of an exemplary "Main" GUI of the parts marking system of FIG. 2.

When the facilitator 101 selects the pushbutton 414, the PML 214 stores the part number in the part data 226 of the PMD 216 and displays to the display device 210 the "Main" GUI 500 of FIG. 8, which is described in more detail hereafter.

Furthermore, the GUI 400 enables a facilitator 101 to search the PMD 216 for existing part numbers. In this regard, the facilitator 101 may search existing part numbers by part number, common name, national stock number (NSN), or nomenclature. Thus, the GUI 400 comprises an "Enter a Part Number String" text box 404, an "Enter a Common Name String" text box 405, an "Enter an NSN String" text box 406, and an "Enter a Nomenclature String" text box 407.

When the facilitator 101 enters data into any one of the text boxes 404-407 and selects a "Search" pushbutton 416, the PML 214 displays a list of part numbers associated with the entered search string, i.e., part number, common name, NSN number, and/or nomenclature. The facilitator 101 can then select the part from the list of parts, and when the facilitator 101 selects the desired part, the PML 214 displays the "Main" GUI 500 (FIG. 8) exhibiting the selected part.

Additionally, the GUI 400 enables a facilitator 101 to edit and/or view a part number. Thus, the GUI 400 comprises a "Choose a Part Number" text box 420. When the facilitator 101 enters/chooses data into the text box 420 and selects an "Edit/View" pushbutton 421, the PML 214 retrieves information from the PMD 216 corresponding to a part that matches the data entered/chosen into the text box 420. The PML 214 displays the retrieved information in the "Main" GUI 500 described in more detail with reference to FIG. 8.

Figure 6:
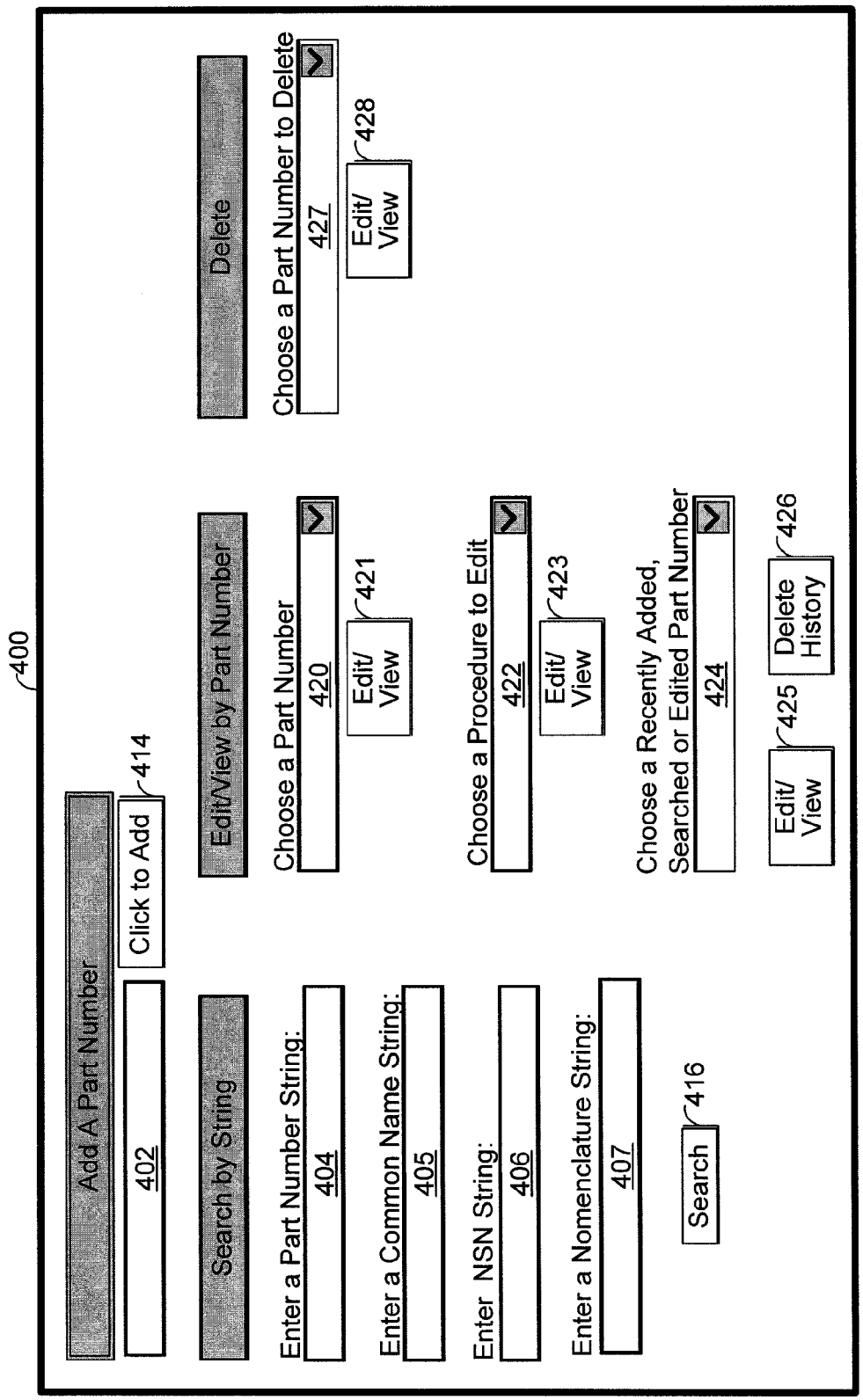
FIG. 6 is a depiction of an exemplary Add/Search GUI of the parts marking system of FIG. 2.

In addition, the GUI 400 comprises a "Choose a Procedure to Edit" text box 422 and corresponding "Edit/View" pushbutton 423 that, when selected, displays the GUI 500 of FIG. 8 exhibiting the part number associated with the procedure number entered/chosen into the text box 422 (FIG. 6). Therefore, if the facilitator 101 desires to edit a procedure, the facilitator 101 can enter/choose the procedure number into text box 422, select the pushbutton 423, and the PML 214 displays the GUI 500 corresponding to the particular part number.

In addition, the GUI 400 comprises a "Choose a Recently Added, Searched or Edited Part number" pull down menu 424. Therefore, the facilitator 101 may select a recently added, searched or edited part number and select the "Edit/View" pushbutton 425 to edit or view the part number or select the "Delete History" pushbutton 426 to delete the part numbers in the pull down menu 424 from history.

Further, the GUI 400 enables a facilitator 101 to delete a part number from the PMD 216. In this regard, the facilitator 101 can enter/choose a part number into text box 427 and select the "Delete" pushbutton 428. The PML 214 then deletes the part associated with the entered/chosen part number from the PMD 216.

FIG. 8 depicts the "Main" GUI 500. As described herein, the GUI 500 is generally displayed by the logic 214 when the facilitator 101 elects to retrieve information corresponding to a particular part or elects to edit an existing part stored in the PMD via the GUI 400 (FIG. 6). In this regard, the PML 214 retrieves desired information from the PMD 216 and populates the GUI 500 with the information retrieved.

Furthermore, the "Main" GUI 500 is displayed by the logic 214 when the facilitator 101 selects the "Click to Add" button 414 (FIG. 6). The GUI 500 displays the added part number and description information and the PML 214 stores data in PMD 216 corresponding to the new part number not already in the PMD 216. In this regard, the PML 214 displays the GUI 500 to the display device 210, and the facilitator enters data into the GUI 500 related to the part that the facilitator 101 desires to enter into the PMD 216.

The GUI 500 of FIG. 8 comprises a text box 502 that the logic 214 populates with a desired part number, which is entered into the GUI 400 as described herein. Note that the part number, common name, and/or nomenclature displayed in text boxes 502, 504, or 506, respectively, may already be stored and correlated in the PMD 216. However, as described hereinabove, the facilitator 101 may desire to enter a new part number in GUI 400 (FIG. 6) by selecting the "Click to Add" pushbutton 414 after entering a part number in text box 402 (FIG. 6). Furthermore, the GUI 500 comprises a text box 508 for displaying or entering data that describes the location of the part identified in the "Part Number" text box 502.

In one embodiment, the GUI 500 comprises a window 510 for displaying several photographs and/or drawings indicative of the part identified in the text box 502. Note that the drawing may be in any format, e.g., portable document format (PDF), tagged image file format (TIFF), or a windows bitmap (BMP).

In this regard, the PML 214 may retrieve several photographs and/or drawings from the PMD 216 and display the photograph or drawing in the window 510 along with an associated caption describing the photograph or drawing in text box 512. Additionally, the GUI 500 comprises a "Browse" button 511. When the facilitator 101 selects the button 511, the logic 214 displays data indicative of the file system (not shown) of the PMS 100, and the facilitator can select from the file system a file name indicative of a file that contains data defining a photograph or drawing of a part, which the logic 214 can display in window 510.

Furthermore, the GUI 500 may comprise an "Enlarge" pushbutton 1871, a "Select Drive" pushbutton 1872, and an "Add/Delete Label Location" pushbutton 1873. The "Enlarge" pushbutton 1871, when selected, may display an enlarged version of the drawing and/or photograph in window 510. The facilitator 101 and the PMS team may then be able to view in better detail that which is displayed in window 510.

The GUI 500 comprises a "Record Navigation" menu 515 and a "Mark Analysis" menu 519. The "Record Navigation" menu 515 comprises a "General" pushbutton 516 and a "Main" pushbutton 518, which generally enable a facilitator 101 to access data currently being stored in the PMD 216 (FIG. 2).

Figure 13:
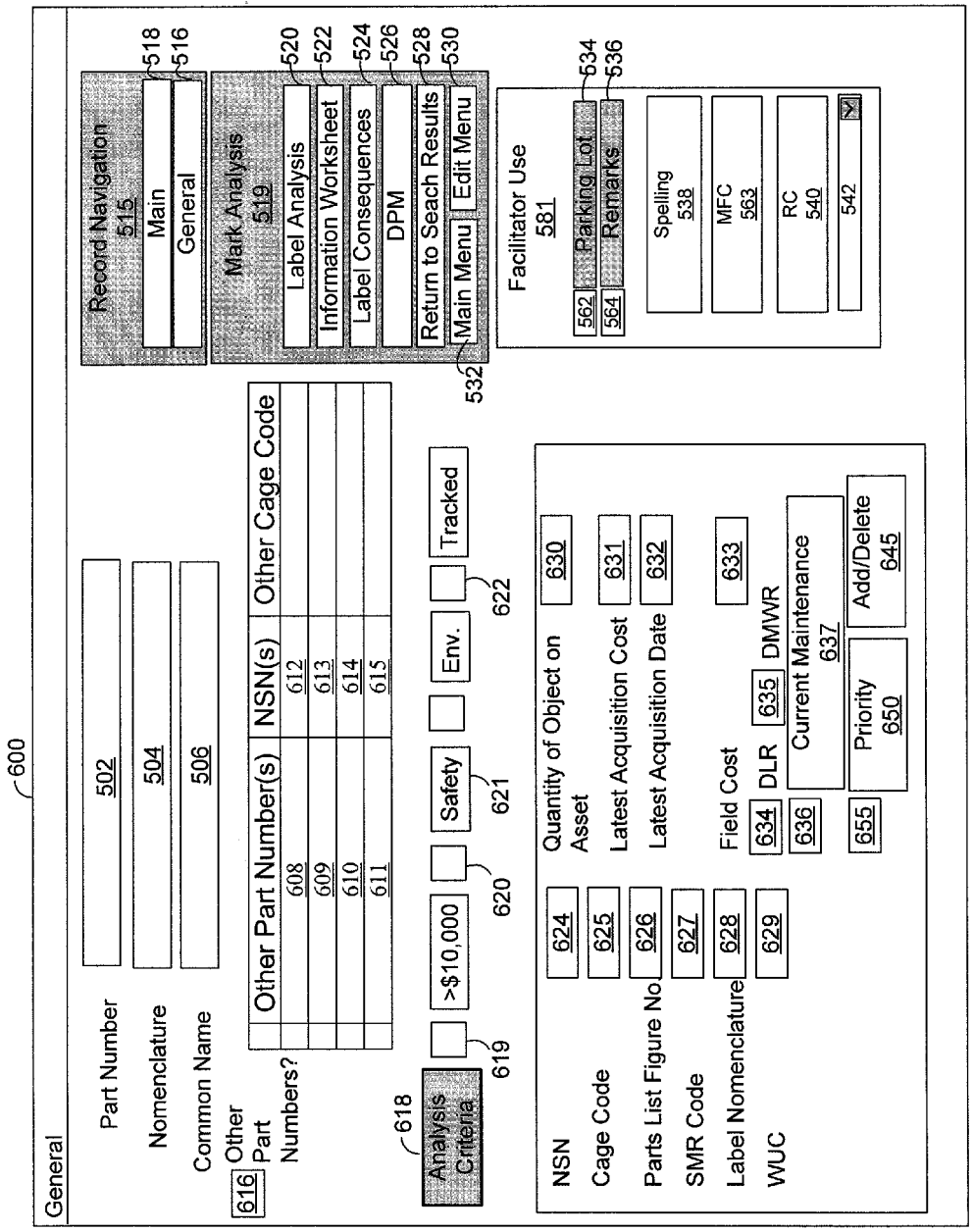
FIG. 13 is a depiction of an exemplary "General" GUI of the parts marking system of FIG. 2.

When the facilitator 101 selects the "General" pushbutton 516, the PML 214 (FIG. 4) displays to the display device 210 a "General" GUI 600, which is described in more detail with reference to FIG. 13. The GUI 600 (FIG. 13) provides general information about the part currently selected in the "Part Number" text box 502 of FIG. 8.

When the facilitator 101 selects the "Main" pushbutton 518, the logic 214 (FIG. 4) displays to the display device 210 the "Main" GUI 500, which is described hereinabove with reference to FIG. 8.

The "Mark Analysis" menu 519 comprises a "Label Analysis" pushbutton 520, an "Information Worksheet" pushbutton 522, and a "Label Consequences" pushbutton 524. Each button 520, 522, and 524 provides a specific analysis functionality with respect to an object identifier that is to be used on the part identified in the text box 502, and each is described in more detail with reference to FIGS. 14-16.

Additionally, the GUI 500 comprises a "Direct Parts Marking" (DPM) pushbutton 526, a "Return to Search Results" pushbutton 528, a "Main Menu" pushbutton 532, and an "Edit Menu" pushbutton 530.

When the facilitator 101 selects the DPM button 526, the logic 214 displays to the display device 210 the GUI 1000, which is described in more detail with reference to FIG. 17. When the pushbutton 528 is selected, the logic 214 displays a listing of parts that may have resulted in an earlier search as described with reference to FIG. 6. The button 532 displays the "Parts Marking" GUI 300 of FIG. 5, and the button 530 displays GUI 400 of FIG. 6.

The GUI 500 further comprises a text box 556 for providing the status of a record, and a button 560 that, when selected, displays the status history of a record. Further, the GUI 500 comprises a text box 554 for displaying the object identifier category of the currently displayed part, a text box 552 for displaying a procedure number associated with the part, and an automation button 558 for automatically formulating a procedure number.

When the part that is currently being displayed has associated validation remarks, such remarks are indicated in check box 586. In this regard, a facilitator 101 can select "Validation Remarks" pushbutton 550 to open a window comprising an editable text box (not shown). The facilitator 101 can enter data indicative of validation remarks in the text box, and when the facilitator 101 returns back to the "Main" GUI 500, the check box 586 exhibits a check indicating that there are validation remarks.

In addition, if the PMS team determines that the part currently displayed is not a parts marking candidate, then the facilitator 101 can select the push button 548, and the PML 214 displays an editable text box (not shown) in which the facilitator 101 can enter data indicative of reason why the part is not a parts marking candidate even though the part meets other parts marking criteria laid out in the implementation information and strategies. When the facilitator 101 returns back to the "Main" GUI 500, a check box 587 exhibits a check indicating that there are reasons indicated for why the part is not a parts marking candidate.

Furthermore, the "Facilitator Use" menu 581 comprises a "Revision Information" check box 589 to indicate that revisions of the information related to the part exist. In this regard, the "Revision Information" pushbutton 588, when selected, displays an editable text box for entering revision information. When the facilitator 101 returns back to the "Main" GUI 500, the check box 589 exhibits a check indicating that there is revision information.

As described herein, a part may be a member of a plurality of parts, wherein a batch number identifies the plurality. Data indicative of the batch in which the part number belongs is exhibited in text box 590. As the approval process for parts marking descriptions for the plurality associated with the batch number is analyzed and reviewed, the parts can be retrieved by searching the PMD 216 via the batch number.

The GUI 500 further comprises a check box 562 that indicates that a part is currently listed in the "Parking Lot." Note that when a part is listed in the "Parking Lot," such indication means that prior to making a decision on the part's marking analysis, additional information may be needed. Thus, the facilitator 101 can enter data describing the reasons for the part being in the parking lot into editable text box 534. Thus, when the facilitator 101 returns back to the "Main" GUI 500, the check box 562 exhibits a check indicating that there is parking lot information.

Further, there may be additional remarks related to the part. If so, then the GUI 500 further comprises a "Remarks" pushbutton 536 and a corresponding check box 564, which behave substantially similar to the "Parking Lot" pushbutton 534 and corresponding check box 562.

The GUI 500 may further comprise a "Record Copy" pushbutton 540, a "Spelling" pushbutton 538, and a "Master Facilitator Copy" pushbutton 563. The "Spelling" pushbutton 538, when selected, checks the spelling in the displayed descriptions and other displayed text. The facilitator may select the pushbutton 538 in order to run a spell check on the information provided in the GUI 500.

Further, the "Record Copy" pushbutton 540 is for providing a record copy of another part number to transport into the current working record. In one embodiment, the pushbutton 540 displays a window from which data can be cut and pasted into the GUI 500. In another embodiment, the pushbutton 540 automatically transports selected data into the GUI 500 without the facilitator having to cut and paste the data.

"Master Facilitator Copy" pushbutton 563 is for displaying a master record copy (not shown) for use by the facilitator 101. The master record copy preferably is a window that shows all the information related to the part including its marking information.

In addition, the "Facilitator Use" menu 581 comprises a "Date Entered" text box 544 for entering the origination date of the information relating to the part currently displayed in the text box 502. Further the menu 581 comprises a "Date Analyzed" text box 546 for entering data indicative of the date on which a parts marking analysis was performed for the part number displayed in text box 502. The "Facilitator Use" menu 581 further comprises an "Action Item" pushbutton 542. The pushbutton 542, when selected, displays a window (not shown) that enumerates at least one action item associated with the identified part. In this regard, the action item window may exhibit data indicative of the part number, common name, actionee (the individual or group that is to take the action), the action to be taken, the due date, and corresponding remarks.

Note that the data described hereinabove that is entered via the GUI 500 is preferably stored in the PMD 216 as part data 226.

As described hereinabove, if the facilitator 101 selects the "General" pushbutton 516, then the PML 214 displays to the display device 210 the GUI 600 described now with reference to FIG. 13. The GUI 600, like the GUI 500, displays or receives text via text boxes, pull down menus, and/or check boxes corresponding to the "Part Number" 502, the part "Nomenclature" 504, and/or the part "Common Name" 506.

Additionally, the GUI 600 comprises a table that includes other part numbers 608-611 that are affiliated with the part currently displayed in text box 502 and each other part number's corresponding NSNs 612-615 including other cage codes. If other part numbers exist in the table, then the text box 616 provides an indication of additional part numbers, e.g., a check mark.

Additionally, the GUI 600 comprises an "Analysis Criteria" box 618. As described herein, the type of criteria that is to be considered when analyzing a part is dependent upon several factors, including the desires of the implementing entity for which the part is being analyzed. In this regard, the "Analysis Criteria" box 618 can comprise a plurality of configurable check boxes to indicate if one or more of the listed criteria pertains to the displayed part number. For example, the box 618 comprises selection boxes 619, 620, 621, and 622 and exhibit specific analysis criteria. When box 619 is selected, this indicates that the part costs more than $10,000, if the "safety" box 620 is checked this indicates that the part has safety consequences, if the "environmental" box 621 is selected, this indicates that failure of the part has environmental consequences, and the "tracked" box 622, if checked, indicates that the implementing entity desires to track the part number for a particular reason. Thus, if one or more of these boxes is check, then there exists a reason(s) for labeling the part with an object identifier. As described hereinabove, other analysis criteria in other embodiments are possible depending upon the type of parts that are indicated in the implementation information and strategies for marking and any requirements that may be placed upon an implementing entity. Thus, the boxes 619-622 are configurable based upon such analysis criteria identified.

The GUI 600 comprises an "NSN" text box 624 for displaying the NSN information related to the part, a "Cage Code" text box 625 for displaying the cage code associated with the part number, an "Parts List Figure No." text box 626 for displaying a figure number corresponding to a drawing associated with the part number, a source maintenance recoverability ("SMR) Code" text box 627 for entering and/or displaying the SMR code associated with the part number, a "Label Nomenclature" text box 628 for displaying the label nomenclature associated with the part number, and a work unit code ("WUC") text box 629 for entering and/or displaying the WUC code associated with the part number. Further, the GUI 600 comprises a "Quantity of Object on Asset" text box 630 for entering and/or displaying the quantity or number of a particular part contained on a particular asset, e.g., two rotary blades on a helicopter. The "Latest Acquisition Cost" text box 631 may be provided for entering and/or displaying the latest acquisition cost associated with the part number, and the "Latest Acquisition Date" text box 632 may be provided for entering and/or displaying the latest acquisition date associated with the part number. Other information that may be provided including a "Field Cost" text box 633 for entering and/or displaying the field cost for which the displayed part is bought by the end user.

The GUI 600 further provides boxes 624-633, check box 634, and text boxes 635 and 636 for entering and/or displaying information provided by the facilitator 101 relating to the part number indicated in text box 502. Such information is configurable based upon the application in which the PMS 100 is used. For example, the check boxes 624-634 may be used to provide additional tracking information or maintenance characteristics or additional maintenance and/or part management data.

Additionally, the GUI 600 comprises a "Priority" pushbutton 650, a check box 655, and "Add/Delete Priority" pushbutton 645. When the pushbutton 650 is selected, the PML 214 displays a window comprising a list of priority indicators for marking of the part. Such data may include, for example, "funding availability" priority indicator or "immediate" indicator. The facilitator 101 can add priority indicators by selecting a pushbutton (not shown). If priority data is provided for the displayed part, the PML 214 displays an indicator in check box 655. The GUI 600 further comprises a "Current Maintenance" push button 637 that, when depressed, displays an editable text box for entered current maintenance package information associated with the part being analyzed. When information is entered in the editable check box, the PML 214 displays an indicator in check box 636.

Note that each of the informational check boxes 624-633 and 635-636 are populated with data that is provided prior to analysis. However, some of the data, for example the current maintenance data in the aforedescribed editable text box, may be retrieved from the team during analysis. Further note that the analysis criteria in box 618 and the additional information in text boxes 624-635 are exemplary criteria only, and other criteria can be used in other embodiments depending upon an implementing entity's requirements.

Once the facilitator 101 has entered information corresponding to the part number displayed in the text box 502, the PMS team performs an analysis to determine if a label or labels are technically appropriate. In this regard, the facilitator 101 selects the "Label Analysis" pushbutton 520, and the PML 214 displays to the display device 210 a GUI 700 illustrated in FIG. 14.

As described hereinabove, the "Label Analysis" screen is preferably generated based upon label algorithm data 232, which is obtained from implementation information and strategies for a particular implementing entity. For example, if it is determine that there are two types of labels available, a one-part and a two-part, then the first question in the "Label Analysis" GUI 700 is "Is there room for a two-part label?"

The GUI 700 comprises a selection box 702 for selecting an option that is also provided by the label algorithm data 232. For example, the selectable option data may be an affirmative or a negative response to whether there is room on the part being analyzed for placing a two-part label. Thus, the PMS team answers the question of whether there is room on the part for a two-part label, and if the PMS team determines that there is room for a two-part label, then the facilitator selects an affirmative indication for the box 702. For example, the box 702 may provide a pull down menu when the down arrow 701 is selected. Thus, the facilitator 101 may select a "Yes" or a "Y" from the pull down menu to indicate an affirmative response. To the contrary, the part may not be suitable for a two-part label, thus the facilitator 101 would select a negative indication, for example a "No" or an "N," for the text box 702.

The GUI 700 further comprises a selection box 704 for selecting an affirmative or a negative response to the question of whether there is room on the part being analyzed for placing a one-part label. Thus, the PMS team answers the question of whether there is room on the part for a one-part label, and if the PMS team determines that there is room for a one-part label, then the facilitator selects an affirmative indication in the box 704. For example, the box 704 may provide a pull down menu when the down arrow 703 is selected. Thus, the facilitator 101 may select a "Yes" or a "Y" from the pull down menu to indicate an affirmative response. To the contrary, the part may not be suitable for a one-part label, in which case the facilitator 101 would enter a negative indication, for example a "No" or a "N" in the text box 704.

Notably, the queries made on the "Label Analysis" GUI 700 are configurable, as described hereinabove. For example, if an implementing entity that is to use the PMS 100 to perform a label analysis desires not to have any two-part labels, then the question corresponding to the box 702 would not be available. Likewise, if the entity desired to use other types of labels, e.g., tape, then such a selection would be available. Note that the questions that are asked in the label analysis are technical limitations with respect to the use of labels. In this regard, if the part is not big enough for a two-part label, then such a question describes a technical limitation to the use of the two-part label on the part being analyzed.

Once the PMS team determines whether a two-part label, a one-part label, and/or another type of label known in the art can be used on the part, the PML 214 automatically populates box 708 from question/answers from boxes 702, and 704.

Further, the PMS team describes the optimal location of the label determined. In this regard, the facilitator 101 enters information describing the location on the part for the label type indicated in the text box 708. Notably, the PMS team may navigate to the GUI 500 described with reference to FIG.

8, by selecting the pushbutton 518, and view the photograph or drawing of the part in making the location determination.

Figure 14:
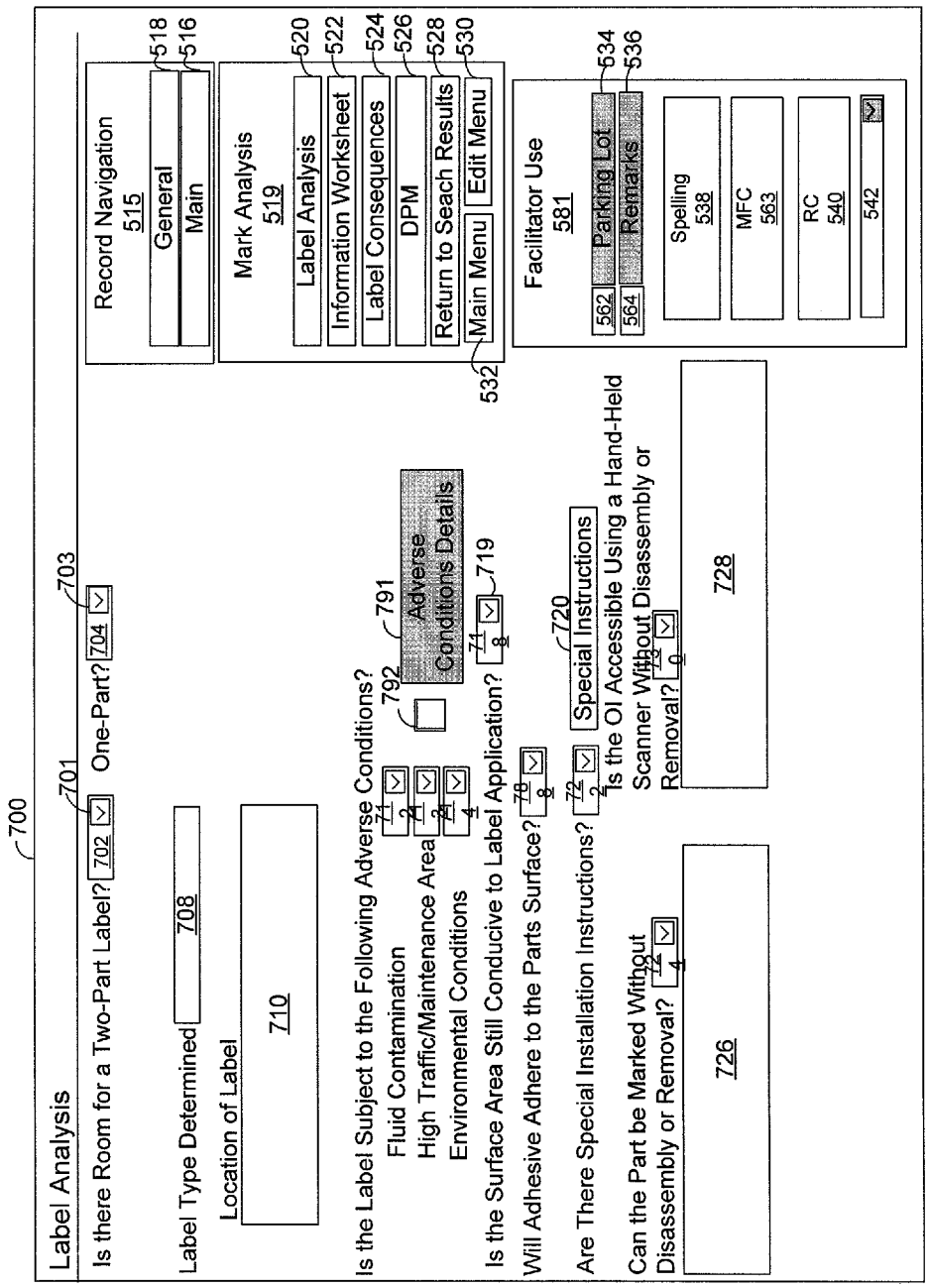
FIG. 14 is a depiction of an exemplary "Label Analysis" GUI of the parts marking system of FIG. 2.

With reference to FIG. 14, the PMS team then provides information describing adverse conditions that the part may be subjected to during operation that may affect whether or not a label is technically appropriate. In this regard, the GUI 700 comprises boxes 712-714 including box 712 for indicating whether the label might be subject to fluid contamination, box 713 for indicating whether the label is subject to high traffic and/or maintenance traffic, and box 714 for indicating whether the label is subject to adverse environmental conditions. In addition, the GUI 700 comprises a check box 792 for indicating whether adverse conditions are described in more detail. In this regard, the facilitator 101 may select the "Adverse Conditions Details" pushbutton 791. If selected, the PML 214 may display a window (not shown) for entering data further describing the details, and the PML 214 may store such data in the PMD 216 associated with the part.

These adverse conditions questions are technical limitations to the label analysis. The facilitator selects options from the pull down boxes 712, 713, and 714. These options and technical limitations are determined by the implementation information and strategies as described hereinabove for each implementing entity. In this regard, the adverse condition questions are also configurable depending upon the type of environment or external exposures that a part may endure during operation.

Further, the GUI 700 provides a box 718 for indicating whether the surface area is still conducive to label application in light of the previous analysis and exists to allow the PMS team to decide if label analysis should be continued. As described hereinabove, the GUI may provide a pull down functionality via the arrow 719. Whether the surface area is still conducive to label application may depend upon a number of factors that the PMS team considers in making such a determination.

Additionally, the GUI 700 comprises a technical limitation described by the query of "Will adhesive adhere to the parts surface" and provides options in a pull down menu 788 for answering such a query.

Further, the GUI 700 provides a box 722 for providing an affirmative or negative option to indicate whether there are special installation instructions for applying the suggested label in box 708 to the part being analyzed. Additionally, the GUI 700 comprises a button 720, and, when selected, the logic 214 displays to display device 210 an editable text box (not shown) in which the facilitator can enter information describing the special instructions determined by the PMS team.

Further, the GUI 700 comprises a box 724 for providing an affirmative or negative option to indicate whether the part can be marked without disassembly or removal. Thus, the facilitator 101 enters an affirmative or negative response determined by the PMS team in the box 724. Corresponding text box 726 receives data indicating the removal or disassembly procedure/details.

The GUI 700 also comprises a box 730 for indicating affirmatively or negatively whether the OI is accessible using a hand-held scanner without disassembly or removal. Thus, the facilitator 101 enters an affirmative or negative response determined by the PMS team in the box 730. Corresponding text box 728 receives data indicating the removal or disassembly procedure/details.

The "Label Analysis" GUI 700 embodies exemplary label algorithm data 232. In this regard, the questions/statements and options provided to respond to the exemplary questions/statements make up an exemplary label algorithm. Other questions/statements in other embodiments of a "Label Analysis" GUI 700 can be used with other options, and such algorithms can be configured based upon the implementation information and strategies as described herein.

The PMS 100 stores data indicative of the selected options and other data entered in the "Label Analysis" GUI 700 in the label analysis data 221 of the PMD 216.

Once the PMS team performs the basic label analysis using GUI 700, the facilitator continues the analysis by selecting the "Information Worksheet" pushbutton 522. When the pushbutton 522 is selected, the logic 214 displays the GUI 800 depicted in FIG. 15 to the display device 210.

The GUI 800 enables the PMS team to perform an information worksheet analysis via the display device 210 and the visual device 110. In this regard, the PMS team begins by identifying a variety of functions, functional failures, failure modes, and failure effects related to the placing of a label on a part or such functions, functional failures, failure modes, and failure effects may be identified prior to the PMS team gathering, and the PMD 216 may be populated with function, functional failure, failure mode, and failure effect data. In this regard, the pre-populated identified functions, functional failures, failure modes, and failure effects may be technical limitations associated with an algorithm, and such functions and functional failures may be stored in the information worksheet data 218 (FIG. 4).

Such function data is entered or displayed into text box 811. When adding a function, the facilitator 101 selects the "Add" pushbutton 801. As the facilitator 101 enters additional functions or scrolls through pre-populated functions, the PML 214 increments a counter in text box 837.

Exemplary functions that may be identified by the PMS team include, for example, to safely and permanently display human and machine-readable part information so that it can be identified and traced, to avoid damage to the part and/or the vehicle in which the part is installed, and to avoid introducing any additional failure modes to the system in which the part is installed. Note that such functions may vary for different applications of the PMS 100.

Once the PMS team has reviewed pre-populated functions and/or added new functions associated with the label under analysis, the PMS team identifies "Functional Failures" associated with each pre-populated function and/or added function. As functional failures are identified, the facilitator 101 enters such functional failure data by selecting an "Add" pushbutton 802 and entering data into the text box 812 describing the functional failure. A counter in text box 827 indicates the number associated with the displayed functional failure in text box 812.

Exemplary functional failures associated with an identified function may include the label falls off, the label is humanly illegible, or the label is not machine-readable. Note that such functional failures may vary for different implementing entities of the PMS 100.

Once the PMS team has identified functional failures associated with the label under analysis, the PMS team identifies "Failure Modes" associated with the identified functional failures. The facilitator 101 enters such failure mode data by selecting an "Add" pushbutton 803 and entering data describing the failure mode in text box 813.

Once the PMS team has identified failure modes, the PMS team identifies "Failure Effects" associated with each failure mode identified. The facilitator 101 enters such failure effects into the text box 814 associated with each failure mode. The described compilation of failure modes and failure effects is hereinafter referred to as a "FMEA."

Based on the FMEA, if the PMS team desires to continue the label analysis, the GUI 800 comprises a box 806 for indicating an affirmative or negative response as to whether to still continue the analysis. Further, the GUI 800 comprises a box 804 for indicating an affirmative or negative response as to whether the label determined in text box 708 (FIG. 14) is recommended in light of the information provided in the FMEA.

Note that the "Record Navigation" menu 515 and the "Mark Analysis" menu 519 behave in substantially the same manner as described hereinabove.

Furthermore, the GUI 800 comprises a "Facilitator Use" box 599. The box 599 comprises a "Spell Check" pushbutton 561 that, when selected, checks the spelling in the text boxes in the GUI 800. The box 599 further comprises a "Totals" pushbutton 562 that when depressed displays a text box (not shown) that details the total number of functions, functional failures, failure modes, and failure effects contained in the information worksheet performed in the GUI 800, when selected. The "Copy" pushbutton 563 displays a copy of the current window so that the facilitator 101 can copy data from one window to the working GUI 800. Further, the "Copy" pushbutton 563 is for providing a record copy of another part number to transport into the current working record. In one embodiment, the pushbutton 563 displays a window from which data can be cut and pasted into the GUI 800. In another embodiment, the pushbutton 563 automatically transports selected data into the GUI 800 without the facilitator having to cut and paste the data.

Finally, the box 599 comprises a "Renumber" pushbutton 564 that renumbers functions, functional failure, failure modes, and failure effects when selected.

The PML 214 stores the FMEA data and any other data entered in the "Information Worksheet" GUI 800 in the information worksheet data 218 (FIG. 4).

Figure 16:
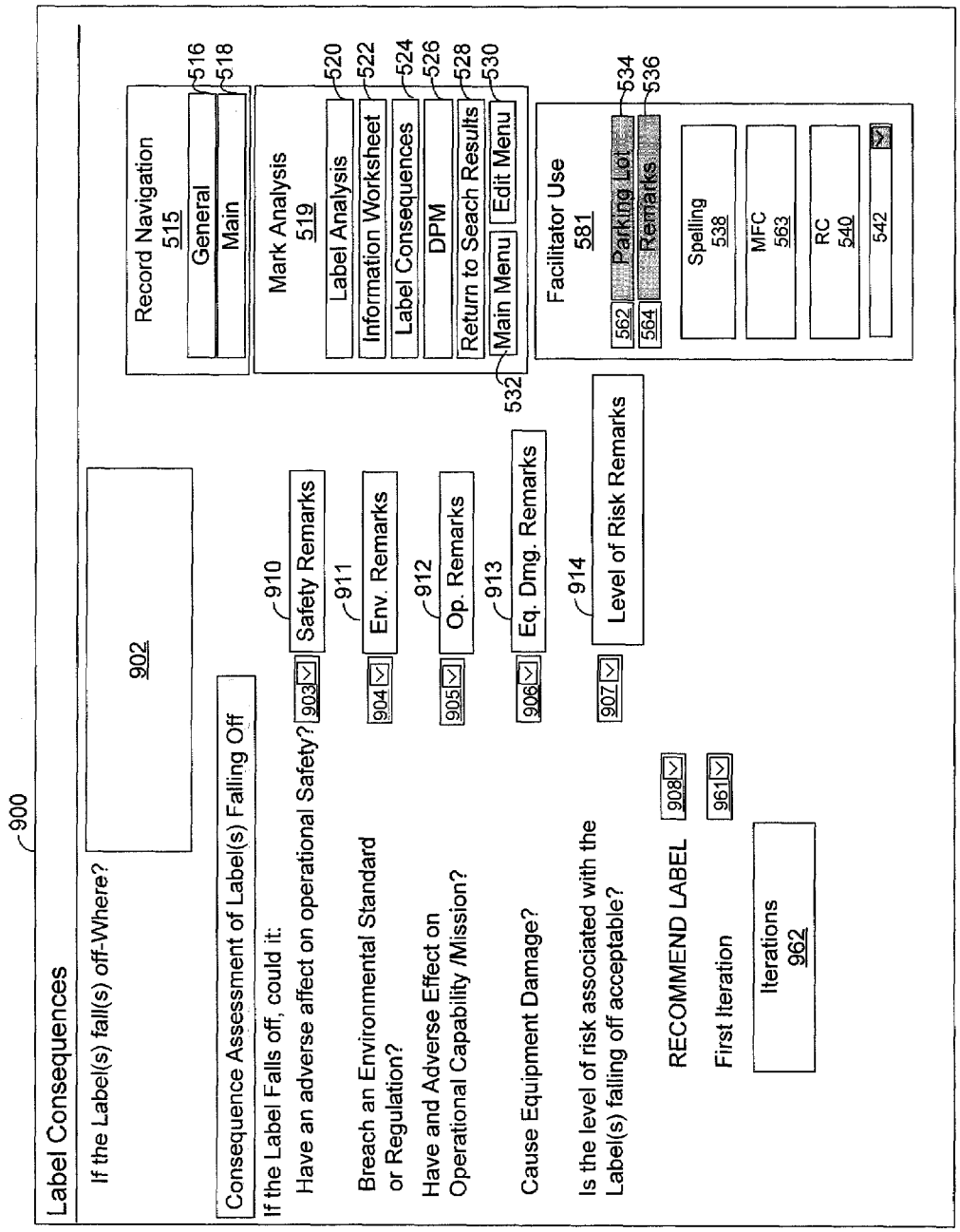
FIG. 16 is a depiction of an exemplary "Label Consequences" GUI of the parts marking system of FIG. 2.

Once the Information Worksheet GUI 800 is completed by the PMS team, the facilitator 101 may select the "Label Consequences" button 524, and the logic 214 displays the GUI 900 described in more detail hereafter with reference to FIG. 16.

The GUI 900 further exhibits a plurality of questions indicative of technical limitations associated with the consequences of a particular label falling off of its location identified in text box 710 (FIG. 14), as described hereinabove. In this regard, the GUI 900 comprises text boxes for entering data and selection boxes for selecting options corresponding to a plurality of queries aimed at gathering information corresponding to the consequences of a label falling off which allows the PMS team to select a label as a marking option.

The GUI 900 comprises a text box 902 for entering data describing where a label conducive to detachment might fall off. Thus, the facilitator 101 requests information from the PMS team corresponding to where a label(s) would fall off, and the facilitator 101 enters such information in text box 902.

The PMS team further analyzes the consequences if the label falls off via the GUI 900 by entering data in boxes 903-907. Furthermore, pushbuttons 910-914 may be selected so that the facilitator 101 can enter additional data regarding each box 903-907.

In this regard, the GUI 900 comprises text box 903 for providing an affirmative or negative response as to whether, if the label being analyzed falls off, if such falling off might have adverse effects on operational safety. If the PMS team determines that there are or are not safety consequences, the GUI 900 further provides a pushbutton 910, and when the button 910 is selected, the logic 214 displays an editable text box (not shown) for entering detailed information corresponding to safety consequences information identified by the PMS team.

The GUI 900 comprises text box 904 for providing an affirmative or negative response as to whether, if the label being analyzed falls off, such falling off might cause a breach of an environmental standard or regulation. If the PMS team determines affirmatively/negatively that there are environmental consequences, the GUI 900 further provides a pushbutton 911, and when the button 911 is selected, the logic 214 displays an editable text box (not shown) for entering detailed information corresponding to the environmental consequences information identified by the PMS team.

The GUI 900 comprises text box 905 for providing an affirmative or negative response as to whether, if the label being analyzed falls off, such falling off might cause an adverse effect on operational capability. If the PMS team determines affirmatively/negatively that there are operational consequences, the GUI 900 further provides a pushbutton 912, and when the button 912 is selected, the logic 214 displays an editable text box (not shown) for entering detailed information corresponding to the operational consequences information identified by the PMS team.

The GUI 900 comprises text box 906 for providing an affirmative or negative response as to whether, if the label being analyzed falls off, such falling off might cause equipment damage. If the PMS team determines affirmatively/negatively that there may be equipment damage consequences, the GUI 900 further provides a pushbutton 913, and when the button 913 is selected, the logic 214 displays an editable text box (not shown) for entering detailed information corresponding to the equipment damage information identified by the PMS team.

The GUI 900 comprises text box 907 for providing an affirmative or negative response as to whether, if the label being analyzed falls off, is the level of risk associated with such falling acceptable. If the PMS team determines affirmatively/negatively that the level risk associated with the label falling off is acceptable, the GUI 900 further provides a pushbutton 914, and when the button 914 is selected, the logic 214 displays an editable text box (not shown) for entering detailed information corresponding to details regarding the level of risk associated with the label(s) falling off identified by the PMS team.

In light of the information provided regarding the consequences of the label falling off, the PMS team then determines whether the label being analyzed is recommended. If the team determines that the label is recommended, the GUI 900 comprises a box 908 for entering an affirmative indication, i.e., a "Yes" or a "Y," that indicates that the label is recommended. Otherwise, the facilitator 101 can enter data indicating that the team does not recommend the analyzed label, i.e., a "No" or a "N." If a negative entry is made in text box 908, the PML 214 displays a dialog box (not shown) that asks whether to continue to the DPM analysis, as described with respect to FIG. 17.

The GUI 900 further comprises a "First Iteration" selection box 961 for selecting whether the recommendation made in box 908 is a result of a first iteration of the algorithm exhibited by GUI 700 (FIG. 14), GUI 800 (FIG. 15), and GUI 900 (FIG. 16). If it is not the first iteration, then the facilitator 101 selects a negative indication form the pull down box 961. In one embodiment, the facilitator 101 selects the pushbutton 962, and the PML 214 displays an editable text (not shown) for entering data describing the first iteration so that an audit trail of decisions can be maintained.

As described herein, DPM is distinguishable from marking via a label. In this regard, DPM refers to placing part information directly on the part. Thus, the PMS team determines whether the part is conducive to DPM by using the GUI 1000 depicted in FIG. 17 and the GUI 1100 depicted in FIG. 18.

Furthermore, GUI 1000 and GUI 1100 embody an exemplary algorithm, e.g., algorithms 2801-2803 (FIG. 2), which will be indicated further herein.

The exemplary GUI 1000 comprises a plurality of questions corresponding to an algorithm for deciding upon a DPM technique. In this regard, the GUI 1000 comprises a text box 1002 for indicating whether the part composition is a metal or a nonmetal. Exemplary metals include, for example, titanium or aluminum. Exemplary nonmetals include, for example, rubber, plastic, or composite materials. As described hereinabove, different materials will have different algorithms associated with them. Thus, the GUI 1000 will change depending upon the type of part that is being analyzed.

In this regard, the text box 1002 may comprise a pull down menu 1001 that lists a plurality of options for the facilitator 101 and the PMS team when selecting data in response to this question. The menu may comprise the different available selections, e.g., metal or nonmetal. Note that the questions related to DPM may vary depending upon the particular application of the GUI 1000. Furthermore, the PML 214 determines the algorithm that is employed in GUI 1100 based upon the selections made on GUI 1000 (FIG. 17). In this regard, if it is a metal and that metal is further identified as "aluminum", then an algorithm comprising marking options corresponding to techniques that are to be used for marking aluminum is displayed when the algorithm is run by selecting a "Run Algorithm" pushbutton 1012, described further herein.

The GUI 1000 further comprises a text box 1004 for indicating whether the surface of the part is painted. In this regard, the text box 1004 may comprise a pull down menu (not shown) actuated by selecting the arrow 1003. The menu may comprise the different available selections, e.g., painted/not painted or true/false. Further, the facilitator may enter an affirmative or negative response, for example, if the surface is painted, the facilitator 101 enters a "Yes" or a "Y" in the text box 1004 by entering text into the box 1004 or selecting an affirmative indication from a pull down menu displayed by selecting the arrow 1003. Again, the algorithm employed to determine whether the part can be marked using DPM and the marking options available for marking the part may aid in defining the algorithm that is employed in GUI 1100, described further herein.

The GUI 1000 further comprises a text box 1006 for indicating whether the surface can be prepared for DPM application. In this regard, the text box 1006 may comprise a pull down menu (not shown) actuated by selecting the arrow 1005. The menu may comprise the different available selections, e.g., "yes" or "no." Note that if the surface cannot be prepared for DPM, and the facilitator 101 answers "no" in box 1006 via the pull down menu 1005, then the PML 214 indicates in text box 1016 that DPM is not possible.

The GUI 1000 further comprises a text box 1008 for indicating the type of metal that the part is made of. In this regard, the text box 1008 may comprise a pull down menu (not shown) actuated by selecting the arrow 1007. The menu may comprise the different available selections, e.g., aluminum, steel, bronze, and/or brass. Note that the pull down selections, e.g., aluminum, steel, bronze, etc., can be populated depending upon the type of application for which the PMS 100 is being used for a specific implementing entity. Furthermore, the PML logic 214 determines the algorithm that is employed in GUI 1100 based upon the selection made in text box 1008. In this regard, if the part is aluminum, then an algorithm comprises DPM marking options corresponding to techniques that are technically possible for marking aluminum and is displayed when the algorithm is run by selecting a "Run Algorithm" pushbutton 1012, described further herein. Furthermore, the answers in text boxes 1002 and 1008 determine the "Metal Group" 1010 in which the part is a member. In this regard, there may be several metals, e.g., aluminum and steel, which belong to the same metal group in that the same algorithm can be used to determine the type of DPM that can be employed to mark the part.

When the facilitator 101 selects the button 1012, the PML 214 displays a GUI 1100 described in more detail with reference to FIG. 18. The GUI 1100 aids the PMS team in deciding which type of DPM is recommended in regard to the part being analyzed.

Once the algorithm is run, the GUI 1000 comprises a "DPM Analysis Results" box 1015 that indicates whether DPM is possible and what types of DPM are possible and not possible for the part being analyzed.

In this regard, the box 1015 indicates in a text box 1016 an affirmative or a negative indication of whether it is possible to use DPM. If DPM is possible at all, the box 1015 further comprises boxes 1018-1021 that indicate which types of DPM are possible, and boxes 1022-1025 that indicate which types of DPM are not possible.

Further, the GUI 1000 comprises a text box 1088 or a pull down menu (not shown) that allows the facilitator 101 to choose which DPM technique is recommended by the PMS team.

As indicated hereinabove, when the facilitator 101 selects the button 1012, the PML 214 displays GUI 1100 of FIG. 18. The PML 214 selects one of a plurality of algorithms that are coded into PML 214 prior to analysis and are based on the specific implementation strategies for a particular implementing entity for display in GUI 1100 based upon the answers to the queries in GUI 1000 (FIG. 17).

The GUI 1100 enables the PMS team to determine which types of DPM are technically appropriate, if any. In this regard, the GUI 1100 comprises a text box 1102 for displaying the metal identified in box 1010 (FIG. 17) and a text box 1104 for displaying the part number associated with the part currently being analyzed. Furthermore, the GUI 1100 provides a box 1106 for indicating which step the PMS team is currently on as it goes through each step in the algorithm depicted in GUI 1100.

As noted herein, the algorithm displayed in GUI 1100 depends upon answers to questions in GUI 1000. In this regard, the algorithm in GUI 1100 comprises four decision areas 1196-1200. As the facilitator 101 enters data indicative to options related to each of the part marking techniques, the PML logic 214 determines, based upon the data entered, whether the marking technique related to the data being entered is possible or not possible. The PML 214 then automatically moves the facilitator 101 on the GUI from one marking technique area 1196-1200 to another.

In decision area 1200, the PMS team analyzes whether the part generally can be marked using a DPM method by displaying questions (not shown) related to general technical DPM limitations. For example, if the part has a surface on which a DPM can be placed or if the surface thickness is adequate for placing a DPM. Note that these questions are configurable based upon the implementing entity for which the particular PMS 100 is designed. For example, aerospace research may disallow DPM for surfaces of a particular thickness or made of a particular type of metal. If the facilitator 101 enters data, based upon input from the PMS team, that indicates that DPM is possible, then the PML 214 automatically controls the analysis flow by highlighting and/or disabling selected decision areas based upon the options selected by the facilitator 101 corresponding to the technical limitations of each DPM technique as described further herein. In this regard, as described herein, the algorithm displayed comprises the decision areas 1196-1199 corresponding to DPM techniques determined to be technically appropriate for the material displayed in text box 1102.

Note that, based upon the answers to the questions in decision area 1200, none or all of the decision areas 1196-1199 may be made editable by the PML 214. Likewise, based upon the answers to the questions in decision areas 1196-1199, one or more of the decision areas 1196-1199 may be made editable by the PML 214.

In one embodiment, if each general technical DPM limitation in decision area 1200 is answered affirmatively, then the PML 214 enables each of the decision areas 1196-1199. However, in other embodiments of the algorithm, other combinations of enabled/disabled decision areas 1196-1199 are possible and are dependent upon the affirmative/negative selected options in decision areas 1196-1199.

If each decision area 1196-1199 is technically appropriate, the PML 214 enables all decision areas 1196-1199 and automatically moves an indicator (not shown) to the dot peen technical limitations 1161. Thus, the facilitator 101 and the PMS team may then provide affirmative/negative responses corresponding to the dot peen technical limitations 1161 of the decision area 1196. If during analysis of the dot peen technical limitations 1161 the facilitator 101 enters a negative response, then the PML 214 automatically moves the indicator to the ink jet technical limitations 1162 of the decision area 1197. If the answers to such technical limitations indicate that dot peen can not be performed, then the PML 214 (FIG. 4) places a "No" in text box 1144. If the answers to such technical limitations indicate that dot peen can be performed, then the PML 214 (FIG. 4) places a "Yes" in text box 1130., Thus, as indicated herein above, after it is determined whether or not dot peen is possible, the PML 214 automatically moves the indicator to the ink jet technical limitations 1162 of the decision area 1197. If during analysis of the ink jet technical limitations 1162 the facilitator 101 enters a negative response, then the PML 214 automatically moves the indicator to the laser bond technical limitations 1163 of the decision area 1198. If the answers to such technical limitations indicate that ink jet can not be performed, then the PML 214 (FIG. 4) places a "No" in text box 1145. If the answers to such technical limitations indicate that ink jet can be performed, then the PML 214 (FIG. 4) places a "Yes" in text box 1140., Thus, as indicated herein above, after it is determined whether or not ink jet is possible, the PML 214 automatically moves the indicator to the laser bond technical limitations 1163 of the decision area 1198. If during analysis of the laser bond technical limitations 1163 the facilitator 101 enters a negative response, then the PML 214 automatically moves the indicator to the chemical etching limitations 1164 of the decision area 1199. If the answers to such technical limitations indicate that laser bond can not be performed, then the PML 214 (FIG. 4) places a "No" in text box 1160. If the answers to such technical limitations indicate that laser bond can be performed, then the PML 214 (FIG. 4) places a "Yes" in text box 1162.

Thus, as indicated herein above, after it is determined whether or not laser bond is possible, the PML 214 automatically moves the indicator to the chemical etch technical limitations 1164 of the decision area 1199. If during analysis of the chemical etch technical limitations 1164 the facilitator 101 enters a negative response, then the PML 214 places a "No" in the text box 1146 and the algorithm terminates. If the answers to such technical limitations indicate that chemical etching can be performed, then the PML 214 (FIG. 4) places a "Yes" in text box 1148 and the algorithm terminates Note that, the decision areas 1196-1199 are arranged in succession within the algorithm so that each decision area 1196-1199 is enabled/disabled as a result of the affirmative/negative answers to the general technical limitations or preceding technical limitations 1161-1163. In this regard, the PML 214 automatically moves the indicator from the preceding decision area 1200 or 1196-1198 to the next decision area 1196-1199. However, in other embodiments, the decision areas may be enabled/disabled and the indicator may be automatically moved independent of the affirmative/negative answers to the preceding technical limitations 1161-1163.

In yet another embodiment, if in decision area 1200, based upon options selected in the general technical DPM limitations 1200, the PML 214 determines that chemical etching, for example, is the only technically appropriate DPM technique, the PML 214 may only enable chemical etching decision area 1199. Thereafter, chemical etch decision area 1199 behaves as described herein above.

As noted herein above, if the questions answered in the general technical DPM limitations in decision area 1200 indicate that more than just chemical etching decision area 1198 is technically appropriate, those applicable decision areas 1196, 1197, and 1199 are enabled by the PML 214.

Note that, the DPM techniques illustrated in GUI 1100 are for exemplary purposes and varying combinations of those identified DPM techniques or different DPM techniques may be used in other embodiments. Further note that, four DPM techniques are shown in the algorithm in GUI 1100 for exemplary purposes. However, other quantities of DPM techniques in other embodiments are possible.

GUI 1100 further comprises a "Facilitator Use" menu 1121. The menu 1121 provides text boxes 1167 and 1169 for entering additional information related to the part being analyzed. In this regard, if there is additional information needed in order to make a determination as to the label algorithm, the facilitator 101 selects the "Parking Lot" pushbutton 1167, and the PML 214 displays an editable text box (not shown) for entering information corresponding to the additional information needed for the analysis. The PML 214 then enters an indication in the "Parking Lot" box 1166, e.g. a check mark, indicating that additional information is needed. Further, the GUI 1100 provides the "DPM Remarks" check boxes 1168, and the PML 214 enters an indication in the check box 1168 that there are DPM remarks associated with the part being analyzed if the facilitator 101 enters data by selecting the "DPM Remarks" pushbutton 1169. Thus, when the facilitator 101 selects the "DPM Remarks" pushbutton 1169, the logic 214 displays an editable text box (not shown) for entering information corresponding to the remarks related to the analysis.

Further, the "Facilitator Use" menu 1121 comprises a "Start Over" button 1170. Thus, if the facilitator 101 and/or the PMS team determine that the algorithm being performed needs to be started over, the logic 214 resets the GUI 1100 when the facilitator selects button 1170. The menu 1121 also comprises a "Return to DPM" button 1172, and if the facilitator 101 determines that the GUI 1000 (FIG. 17) is needed during the analysis, the PML 214 displays the GUI 1000 when the facilitator 101 selects the button 1172.

Figure 17:
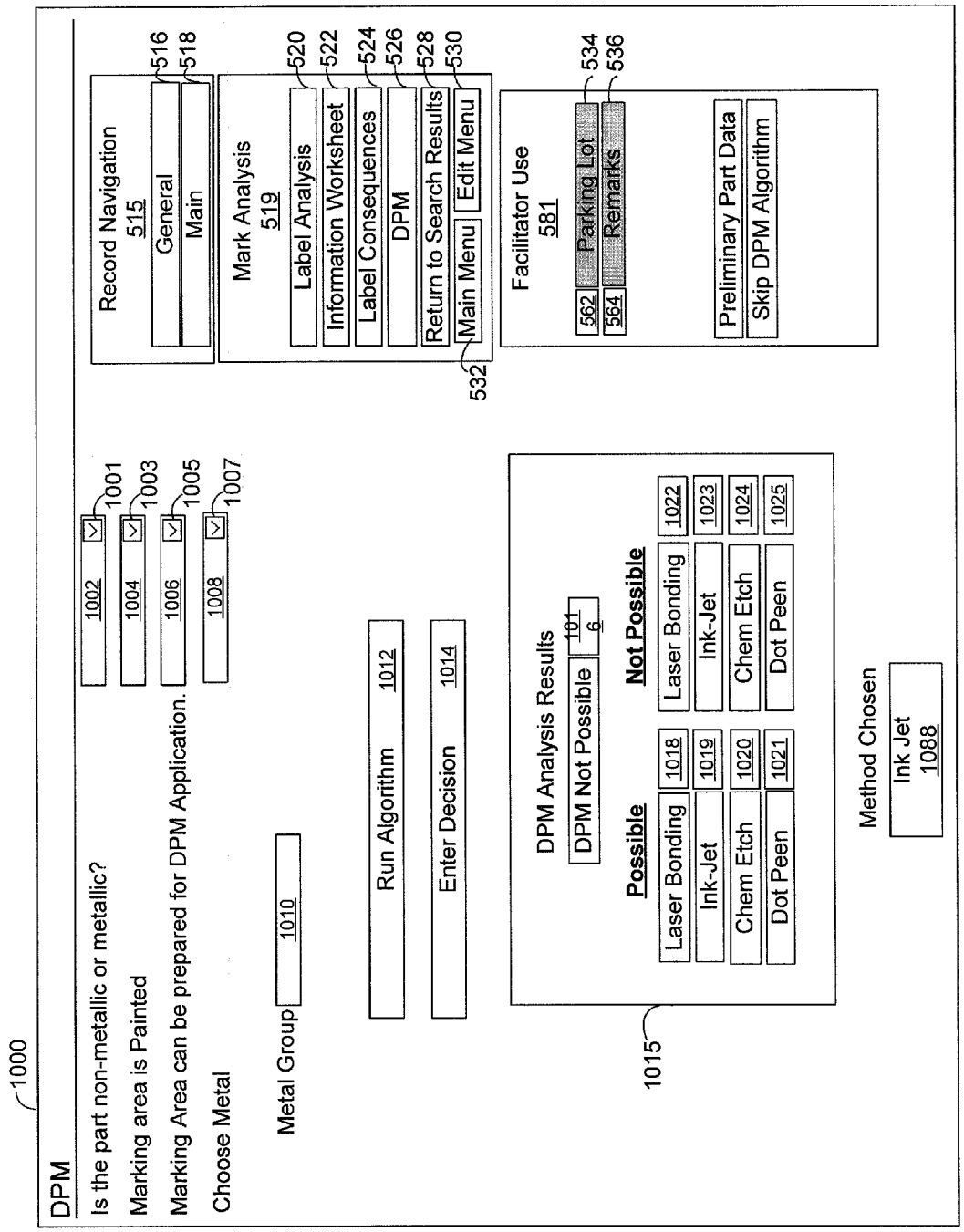
FIG. 17 is a depiction of an exemplary direct parts marking (DPM) GUI of the parts marking system of FIG. 2.
Figure 18:
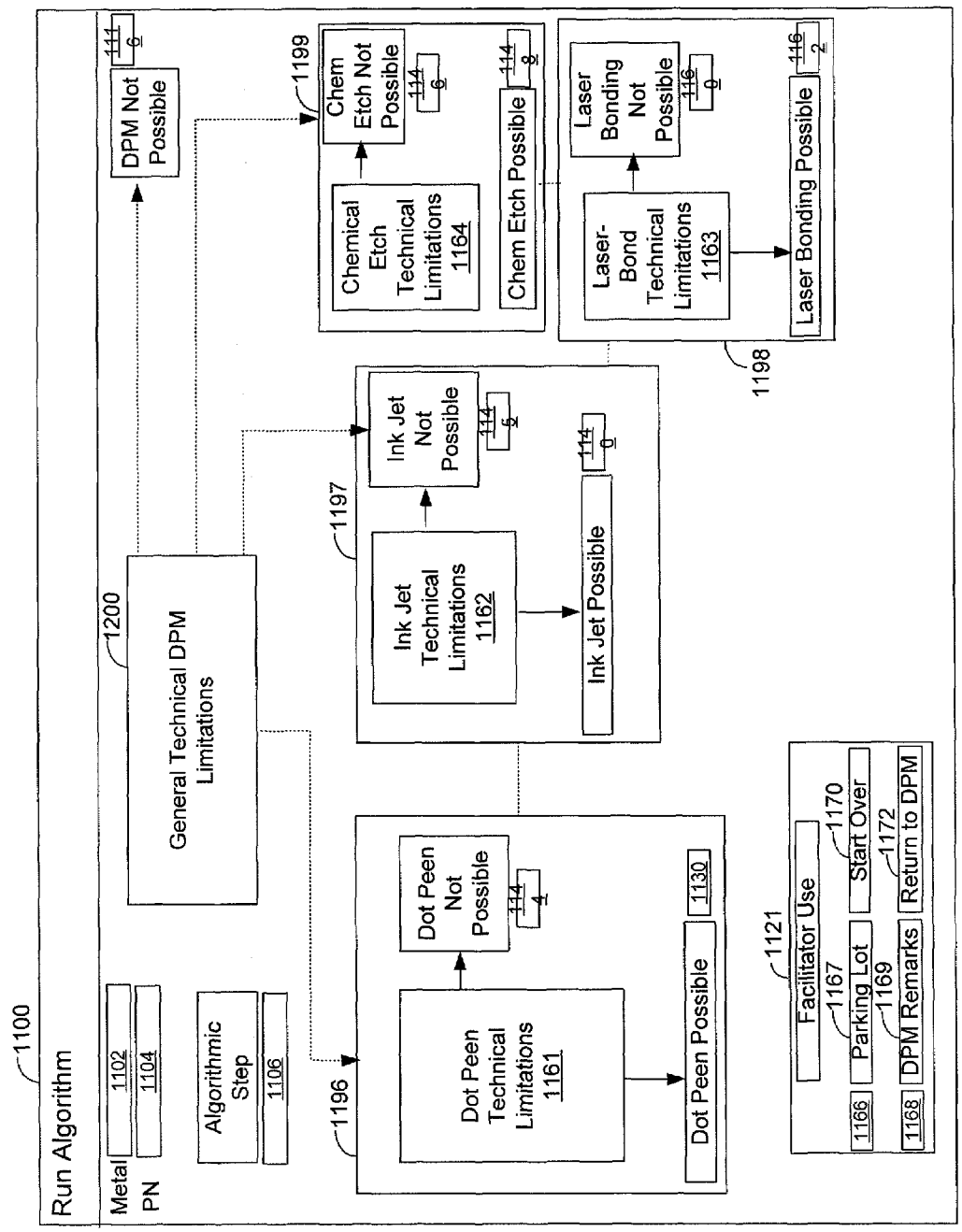
FIG. 18 is a depiction of an exemplary DPM algorithm GUI of the parts marking system of FIG. 2.

With respect to FIG. 17, once the PMS team has completed running the algorithm in FIG. 18, the facilitator 101 may select the "Enter Decision" button 1014. When button 1014 is selected, the logic 214 displays the "Enter Decision for PN" GUI 1200 depicted in FIG. 19.

GUI 1200 illustrated in FIG. 19 comprises a text box 1202 for displaying the suggested order of the parts marking as a result of the DPM algorithm. Such suggested order is predetermined during the implementation information and strategies development, therefore, the text field 1202 is pre-populated. As an example, text field 1202 might exhibit "ink jet, dot peen, chemical etch," and this order may have been determined based upon cost or other factors.

Further, the GUI 1200 comprises text box 1204 for displaying the current part number and a text box 1205 for displaying the current part common name. Further, the GUI 1200 comprises a "DPM Techniques Advantages and Limitations" menu 1208 that shows each of the DPM techniques included in PML 214. The menu comprises pushbuttons 1210-1213 that, when selected, displays the advantages and limitations associated with each DPM technique. Menu 1208 provides a laser bonding button 1210, ink jet button 1211, chemical etching button 1212, and dot peen button 1213, and if the facilitator 101 selects, for example, the laser bond button 1210, the PML 214 displays GUI 1300 of FIG. 20 for PMS team reference purposes. The GUI 1200 further comprises a text box 1288 for entering data indicative of a technically appropriate DPM method chosen by the PMS team for marking the part as a result of the algorithm.

GUI 1300 provides a summary of the advantages and limitations corresponding to laser bond DPM. In this regard, the GUI 1300 may comprise a box 1302 enumerating the advantages of laser bond DPM, which may include that laser bond parts marking is resistant to high heat, is unaffected by salt, fog, and/or spray, exhibits the best resolution, is consistent, and is a non-contact application. On the other hand, the GUI 1300 may comprise a box 1304 enumerating the limitations of laser bond parts marking, which may include that the laser bond parts marking is limited to the work enclosure, it cannot be used to mark on a painted surface, and it is time intensive. GUI 1300 in FIG. 13 displays advantages and limitations specific to laser bonding, however, other techniques will be correlated with other Advantages/Limitations for display in GUI 1300 in other embodiments.

Figure 21:
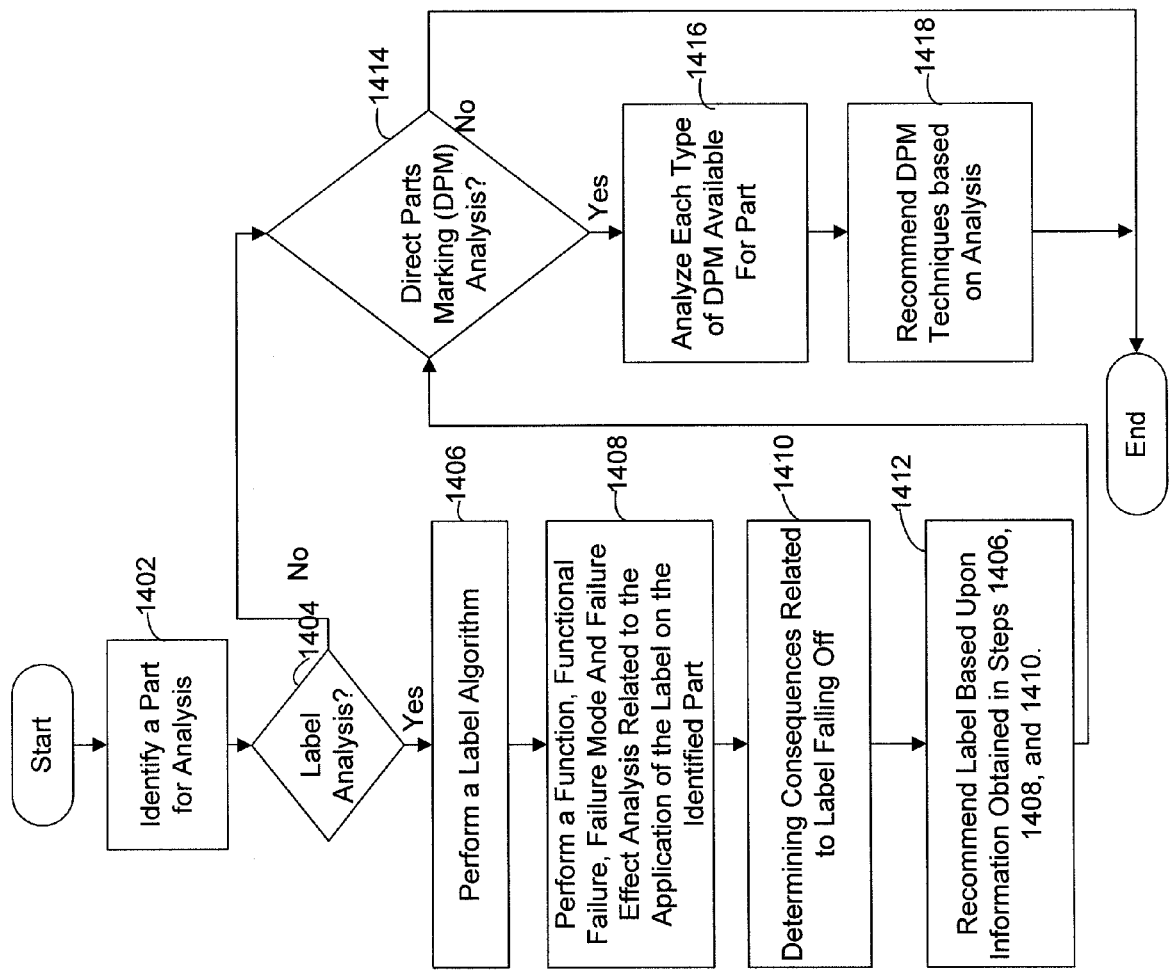
FIG. 21 is a flowchart illustrating an exemplary parts marking process performed using the parts marking system of FIG. 2.

FIG. 21 is a flowchart illustrating an exemplary parts marking process of the present disclosure.

The facilitator 101 and/or the PMS team identify a part for analysis in step 1402. Preferably, information relating to the part identified is gathered prior to any parts marking analysis. For example, the facilitator 101 may collect information including a drawing and/or a photograph or a specification sheet corresponding to the part. Furthermore, as described herein, data relating to a part may be pre-populated prior to the analysis in the "General" GUI 600 depicted in FIG. 13.

The PMS team then determines whether a label analysis is desired in step 1404. If a label analysis is not desired in step 1404, then the PMS team determines in step 1414 whether a DPM analysis is desired.

If a label analysis is desired, then the PMS team performs a label algorithm in step 1406. In this regard, the PMS team determines whether a one-part or two-part label, for example, can be used on the part. Further, the PMS team determines a location for the label, adverse conditions that may affect the label, and other installation instructions. Note that such technical limitations corresponding to a label algorithm are configurable and may change depending upon the implementation strategy and the implementing entity.

The PMS team then performs a function, functional failure, failure mode and failure effect analysis related to the application of the label on the identified part in step 1408. The PMS team then determines consequences related to the label falling off in step 1410.

Based upon the information obtained in steps 1406, 1408, and 1410, the PMS team provides a recommendation on the type of label to use in step 1412.

If a label is not desired in step 1404 or in addition to recommending a label in step 1412, the PMS team then determines whether direct parts marking (DPM) is desirable for the part under analysis in step 1414. If DPM is not desirable, then the analysis ends. However, if DPM is desired, the PMS team analyzes each DPM technique that is pre-populated in the PMS 100 and whether one of the pre-populated DPM techniques can be used on the part in step 1416.

After the PMS team determines the types of DPM that are technically appropriate for use on the part, the PMS team then determines a recommendation of a DPM technique based upon the PMS team analysis and a prioritized list pre-populated of DPM techniques that may be used to mark the part in step 1418.

Figure 22:
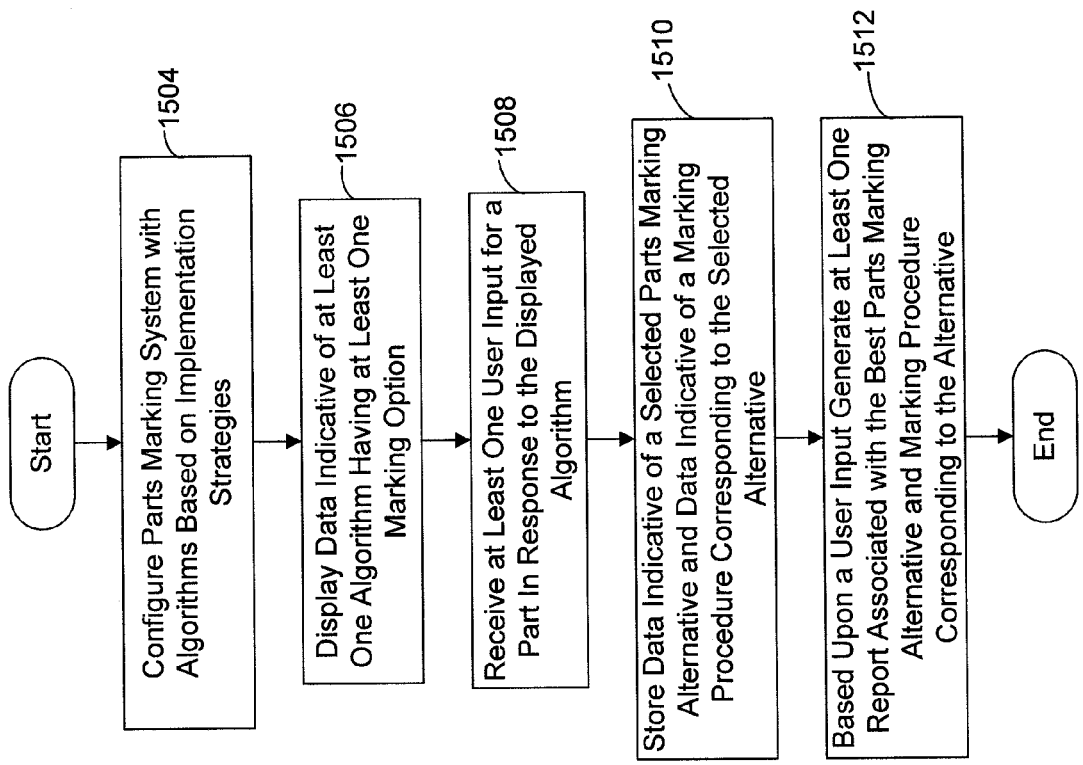
FIG. 22 is a flowchart illustrating exemplary architecture and functionality of parts marking logic of the parts marking system of FIG. 2.

FIG. 22 is a flowchart depicting architecture and functionality of exemplary PML 214 (FIG. 2) of the present disclosure.

The PML 214 configures parts marking options based upon implementation strategies in step 1504. For example, an implementing entity may identify that it is technically appropriate to use labels and specific DPM techniques to mark parts. Such information is used to configure the PMS 100 such that options are made available to the PMS team during analysis to reflect the implementation strategies.

The PML 214 then stores data indicative of a plurality of parts for marking in step 1506. The PML 214 then receives data indicative of parts marking options corresponding to at least one of the parts in step 1508.

The PML 214 then stores data indicative of the determined best parts marking alternative and receives data indicative of a marking procedure corresponding to the selected alternative in step 1510. The PML 214 generates at least one report associated with the best parts marking alternative and marking procedure corresponding to the alternative in step 1512.

The invention claimed is:

1. A parts marking system for determining a type of direct parts marking (DPM) to be used for a particular part, comprising:
    memory for storing data indicative of a plurality of materials out of which the part can be made and storing in memory for each material a plurality DPM techniques and a plurality of technical limitations associated with the DPM technique, the technical limitations including data for determining whether each DPM technique can be used based upon each material;
    logic configured to receive data, via a graphical user interface (GUI), identifying a part and a material out of which the part is made, the logic further configured to display, via the GUI, data identifying at least one of the DPM techniques and the technical limitations associated with the DPM technique, each limitation displayed in the form of a question, the DPM technique and the technical limitations displayed based upon the data identifying the part and the material out of which the part is made.

2. The parts marking system of claim 1, wherein the logic is further configured to display one or more general technical limitations relating to DPM techniques in the form of questions.

3. The parts marking system of claim 1, wherein the logic is further configured to determine, based upon one or more inputs in response to the questions corresponding to the one or more general technical limitations, that DPM is not possible for the identified part and characteristics of the material.

4. The parts marking system of claim 2, wherein the logic is further configured to determine, based upon one or more inputs in response to the questions corresponding to the one or more general technical limitations, that DPM is possible for the identified part and the identified material.

5. The parts marking system of claim 1, wherein the logic is further configured to display one or more specific technical limitations relating to a particular DPM technique in the form of questions.

6. The parts marking system of claim 5, wherein the logic is further configured to determine, based upon one or more inputs in response to the questions, whether the particular DPM technique is possible for the identified part and the identified material.

7. The parts marking system of claim 5, wherein the specific technical limitations and the corresponding questions are related to a dot peen DPM technique.

8. The parts marking system of claim 7, wherein the logic is further configured to determine, based upon one or more inputs in response to the questions, whether the dot peen DPM technique is possible.

9. The parts marking system of claim 5, wherein the specific technical limitations and the corresponding questions are related to an ink jet DPM technique.

10. The parts marking system of claim 9, wherein the logic is further configured to determine, based upon one or more inputs in response to the questions, whether the ink jet DPM technique is possible.

11. The parts marking system of claim 5, wherein the specific technical limitations and the corresponding questions are related to a chemical etch DPM technique.

12. The parts marking system of claim 11, wherein the logic is further configured to determine, based upon one or more inputs in response to the questions, whether the chemical etch DPM technique is possible.

13. The parts marking system of claim 5, wherein the specific technical limitations and the corresponding questions are related to a laser bond DPM technique.

14. The parts marking system of claim 13, wherein the logic is further configured to determine, based upon one or more inputs in response to the questions, whether the laser bond DPM technique is possible.

15. A parts marking method for determining a type of direct parts marking (DPM) to be used for a particular part, comprising:
storing data indicative of a plurality of materials out of which the part can be made and storing in memory for each material a plurality DPM techniques and a plurality of technical limitations associated with the DPM technique, the technical limitations including data for determining whether each DPM technique can be used based upon each material;
receiving data, via a graphical user interface (GUI), identifying a part and a material out of which the part is made;
displaying, based upon the data identifying the part and the material out of which the part is made via the GUI, data identifying at least one of the DPM techniques and the technical limitations associated with the DPM technique, each limitation displayed in the form of a question.

16. The parts marking method of claim 15, further comprising displaying one or more general technical limitations relating to DPM techniques in the form of questions.

17. The parts marking method of claim 16, determining, based upon one or more inputs in response to the questions corresponding to the one or more general technical limitations, that DPM is not possible for the identified part and characteristics of the material.

18. The parts marking method of claim 16, further comprising determining, based upon one or more inputs in response to the questions corresponding to the one or more general technical limitations, that DPM is possible for the identified part and the identified material.

19. The parts marking method of claim 15, further comprising displaying one or more specific technical limitations relating to a particular DPM technique in the form of questions.

20. The parts marking method of claim 19, wherein the logic is further configured to determine, based upon one or more inputs in response to the questions, whether the particular DPM technique is possible for the identified part and the identified material.

21. The parts marking method of claim 19, wherein the specific technical limitations and the corresponding questions are related to a dot peen DPM technique.

22. The parts marking method of claim 21, further comprising determining, based upon one or more inputs in response to the questions, whether the dot peen DPM technique is possible.

23. The parts marking method of claim 19, wherein the specific technical limitations and the corresponding questions are related to an ink jet DPM technique.

24. The parts marking method of claim 23, further comprising determining, based upon one or more inputs in response to the questions, whether the ink jet DPM technique is possible.

25. The parts marking method of claim 19, wherein the specific technical limitations and the corresponding questions are related to a chemical etch DPM technique.

26. The parts marking method of claim 25, further comprising determining, based upon one or more inputs in response to the questions, whether the chemical etch DPM technique is possible.

27. The parts marking method of claim 19, wherein the specific technical limitations and the corresponding questions are related to a laser bond DPM technique.

28. The parts marking method of claim 27, further comprising determining, based upon one or more inputs in response to the questions, whether the laser bond DPM technique is possible.

29. The parts marking method of claim 19, further comprising displaying a list of possible DPM techniques based upon the identified part and identified material.

* * * * *